(12) United States Patent
Abdelwahab

(10) Patent No.: US 11,113,281 B2
(45) Date of Patent: Sep. 7, 2021

(54) EFFICIENT METHOD FOR LOGICAL COMPLETION OF A DEDUCTIVE CATALOGUE USED FOR GENERAL CONSTRAINTS TREATMENT IN THE EXTENDED RELATIONAL DATABASE CONCEPT

(71) Applicant: Elnaserledinellah Mahmoud Elsayed Abdelwahab, Cairo (EG)

(72) Inventor: Elnaserledinellah Mahmoud Elsayed Abdelwahab, Cairo (EG)

( * ) Notice: Subject to any disclaimer, the term of this patent is extended or adjusted under 35 U.S.C. 154(b) by 264 days.

(21) Appl. No.: 15/293,420

(22) Filed: Oct. 14, 2016

(65) Prior Publication Data
US 2017/0249359 A1    Aug. 31, 2017

(51) Int. Cl.
*G06N 5/04* (2006.01)
*G06F 16/2455* (2019.01)
*G06N 5/00* (2006.01)
*G06F 16/2453* (2019.01)
*G06F 16/23* (2019.01)

(52) U.S. Cl.
CPC .... *G06F 16/24542* (2019.01); *G06F 16/2365* (2019.01); *G06F 16/24565* (2019.01); *G06N 5/003* (2013.01); *G06N 5/047* (2013.01)

(58) Field of Classification Search
CPC ......... G06F 17/30371; G06F 17/30463; G06F 17/3051; G06F 16/2365; G06F 16/24542; G06F 16/24565; G06N 5/047; G06N 5/003
See application file for complete search history.

(56) References Cited

U.S. PATENT DOCUMENTS

| 5,216,593 | A | 6/1993 | Dietrich et al. |
| 5,386,557 | A | 1/1995 | Boykin et al. |
| 5,488,722 | A | 1/1996 | Potok |
| 2013/0117323 | A1* | 5/2013 | Lohiya ................ G06F 16/2465 707/793 |
| 2013/0238545 | A1* | 9/2013 | Fuchs .................... G06Q 10/00 706/47 |

OTHER PUBLICATIONS

Elnaserledinellah Mahmood Abdelwahab, Constructive Patterns of Logical Truth, Journal Academica vol. 6(1), pp. 3-96, Feb. 15, 2016 (Year: 2016).*
Elnaserledinellah Mahmood Abdelwahab, On the Dual Nature of Logical Variables and Clause-Sets, Journal Academica vol. 6(3), pp. 202-239, Sep. 15, 2016 (Year: 2016).*

* cited by examiner

*Primary Examiner* — Anhtai V Tran
*Assistant Examiner* — Xiaoqin Hu

(57) ABSTRACT

New methods to represent variables as parts of the classical truth table lead to complete evaluation methods that generate a compiled, efficient version of logical expressions.
The new methods are suitable for use in, e.g., relational database applications in which both, efficient query times as well as logical completeness and consistency are required in the context of general constraint treatments.
Input/output operations remain linear in the length of the input character strings regardless of the complexity of the logical theory.
A new processing method of formulas is described as the basis for the efficiency increase.
In order to find a specific truth-value, pattern trees are used representing the extension of the logical theory.

13 Claims, 24 Drawing Sheets

B. New method:

$f(....) = $ (x0 or x1 or x2) and (not(x10) or not(x21) or not(x2)) and (x6 or x3 or x2) .... and (not(x0) or not(x1) or not(x12)) etc...

↓
Transformation
↓
Pattern Trees       Construction step
↓
Pattern - Resolution
↓
Result Tree $f(....) = $ (1 or 1 or 0 or) und (not(0) or not (0) or not (0)) and (0 or 1 or 0 ) .... and (not (1) or not (1) or not (1)) etc...

↓
Linear  →  Query to result tree    Execution step
>>>>>

ER-Diagram

A. Classic method (arbitrary Turing machine simulates in a logical system):

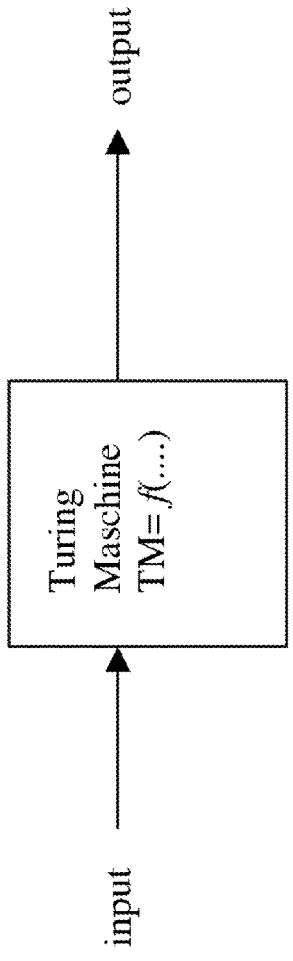

input → Turing Maschine TM= f(....) → output

TM is translated in the logic to clause set (3SAT monotone CNF):

$f(....) = (x0 \text{ or } x1 \text{ or } x2) \text{ and } (\text{not}(x10) \text{ or } \text{not}(x21) \text{ or } \text{not}(x2)) \text{ and } (x6 \text{ or } x3 \text{ or } x2) .... \text{ and } (\text{not}(x0) \text{ or } \text{not}(x1) \text{ or } \text{not}(x12)) \text{ etc}...$

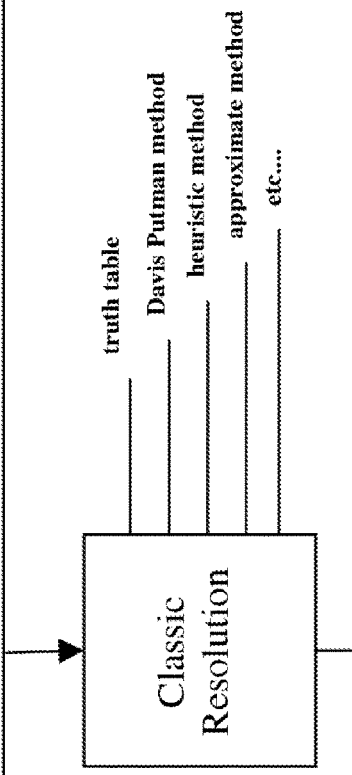

truth table, Davis Putnam method, heuristic method, approximate method, etc.... → Classic Resolution → Truth-value / outputs of machine

Features:
- Processing complexity = construction effort (of the combinatorics) + execution effort
- Use of classic AND, OR, NOT operators

FIG. 5A

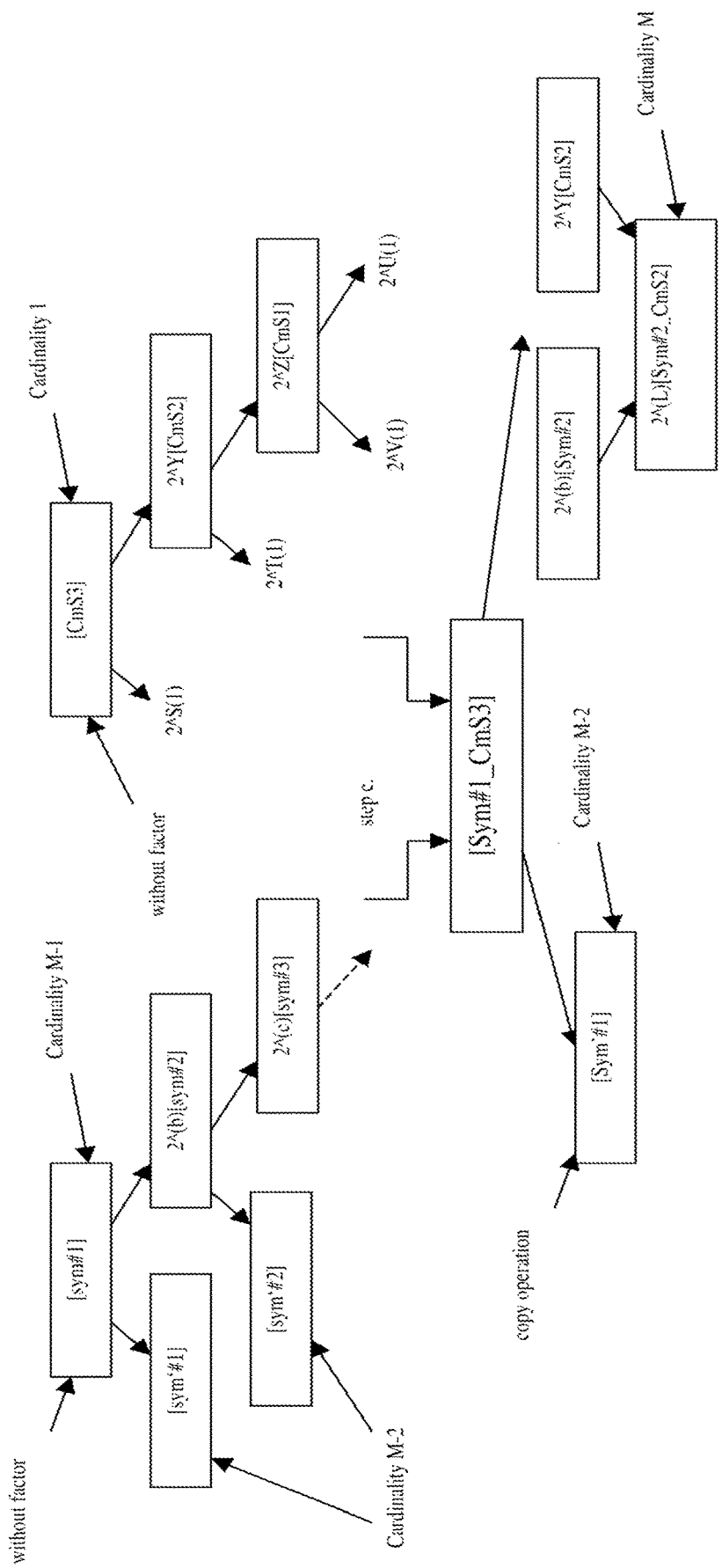

| X0 | X1 | X2 | Classic | Decision Tree |
|----|----|----|---------|---------------|
| 0  | 0  | 0  | 0       | 0             |
| 0  | 0  | 1  | 1       | 1             |
| 0  | 1  | 0  | 0       | 0             |
| 0  | 1  | 1  | 1       | 1             |
| 1  | 0  | 0  | 0       | 0             |
| 1  | 0  | 1  | 1       | 1             |
| 1  | 1  | 0  | 0       | 0             |
| 1  | 1  | 1  | 0       | 0             |

Truth-value-finding between classical substitution in the SAT clauses and the use of the decision tree

FIG. 12E

EFFICIENT METHOD FOR LOGICAL COMPLETION OF A DEDUCTIVE CATALOGUE USED FOR GENERAL CONSTRAINTS TREATMENT IN THE EXTENDED RELATIONAL DATABASE CONCEPT

TECHNICAL FIELD

The invention concerns an efficient method to logically complete a deductive catalogue used for general constraints treatment in the extended relational database concept.

The method, using a new representation of variables which are part of the classical truth table, leads to complete evaluation methods generating a compiled, efficient version of the logical theory used to express general constraints. This innovation allows, in contrast to known methods in deductive databases, linear processing times of inputs which do not involve classical AND, OR or NOT operators. Thus, depending on this new logical completion method, the invention leads to query procedures in the context of deductive databases, which no longer depend on the complexity of the logical form, but on the optimal extension of the logical theory made available in advance.

It serves to improve the query procedure in general, and the efficiency increase in particular because the response procedures of a relational database query, in particular in the case of general, complex constraints involving more than one database field, experience a maximum speed increase.

BACKGROUND ART

Known are general procedures to implement constraints programming used to model mathematical or algorithmic problems by means of discrete or continuous variables. (DE4411514 A1 and U.S. Pat. No. 5,216,593). Their disadvantage is that they are not extendible to database contexts. Known are procedures in which the most important referential integrity constraints are generated before the SQL-execution-plan's activation (U.S. Pat. No. 5,386,557). Disadvantageous is the fact that no other user-defined constraints are permitted. To accomplish this and provide an efficient implementation U.S. Pat. No. 5,488,722 describes a procedure in which different constraints have different execution priorities depending on the possibility of failing to fulfill them. Constraints having higher failure-possibilities are ranked on top of the priority-list. Disadvantageous is that there is no general way to build this list and in case of recursive queries, which have to be used to calculate the priorities, there are always constraints without appropriate rank.

Known are procedures to rank predicates inside a logical program (EP0545090A2). This optimizes the use of those predicates and doesn't alter, however, the inference machine (SLD-resolution). Known are ways to check constraints-satisfaction in huge amounts of data inside a database (EP0726537A1; Hirao, T.: Extension of the relational database semantic processing model, in: IBM Systems Journal, Vol. 29, No. 4, 1990, p. 539-550, and Lippert, K.: Heterogene Kooperation, in: ix Multiuser Multitasking Magazin 7/1994, p. 140-147). They are to be implemented as procedural (non-declarative) descriptions and are cited without reference to the formal or logical properties (i.e., soundness and completeness) of the overall logical system. According to DE19725965C2 methods are known which deal with general constraints in the extended relational database concept at the deductive catalog level. Disadvantageous is here that the extension of the logical theory is very large, i.e., that it can be exponential in the length of the used logical formulas.

Technical Problem

Not known are methods in which general constraint procedures are implemented in extended relational database concepts such that logical completion methods are applied to catalogs efficiently (i.e., not exponentially) to allow maximum execution speed of logical queries:

The Relational Database Model (c.f. Date: An introduction to database systems, Vol. I, Fourth Edition, Adison-Wesley, Massachusetts, 1986 and for a complete overview: DE19725965C2).

The relational database model is a simple form of first-order predicate calculus (PLC1). The concepts: Relation, Domain, Attribute and interpretation have the same meaning in the RDM as they have it in logic. The only objects in the RDM are tuples. A tuple is a collection of attributes which serve intensional purposes. Tuples are collected in tables which form (through their tuples) so-called schematic consistency. They are classified according to their contribution to this consistency into base and auxiliary tables. The RDM System is a picture of the mini-world, which is a logical snapshot of the world to be implemented. This mini-world is translated into RDM-terminology via semantic tools of which ER-Diagrams are best known. An ER-diagram produces a scheme which contains the basic consistency-properties of the mini-world, i.e. relations between objects modeled using cardinalities (among other methods). Key-attributes play a central role in this schematic-consistency. They guarantee referential integrity and therefore also normal-form properties. Referential integrity means the existence of corresponding values of base-table attributes in auxiliary tables, vice versa.

The inference language SQL with which a query is sent to the RDM system is a logic-based declarative language which is not capable of providing the full functionality of a normal programming language. It contains especially no recursive definition facilities. General consistency properties (like transitive closure of tables) are therefore not expressible in SQL and need external programming efforts. Some of the efforts may be procedural and lack therefore the clearness of form—others are declarative and have the disadvantage of being complex and only valid in very special modeling situations. Since RDM is based on logic it contains the well-known classification of language-levels into object- and meta-levels. The RDM has only two such levels: the tuple or data-level and the catalogue. The catalogue usually contains all the needed important information concerning tables and their relations, indexes and valid execution paths. If it contains more than this (i.e., information about organizational aspects other than those needed for RDM-implementation), it is called a data-dictionary. A real RDM system has the components shown in FIG. 1. Tj (j=1 ... n) stands for table names. Arrows symbolize data transfer. The catalogue is used to store specifications of database schemes (DDL-compilers) to be matched against user-queries (using DML-parsers). In the same time it contains important file descriptions to simplify DML-compile operations and provide the possibility of translation into appropriate machine codes. DML-optimizations use field-descriptions and consider index and hash-functions, for example when generating a query-execution-plan. Additionally, many heuristic optimization-decisions (like selectivity-estimates) reside as appropriate assertions about the database in the catalogue. Other functions of the catalogue include also storing security control information and the guarantee of translating database views into the original database schemes.

Constraints Verification

In addition to the above mentioned key-attribute integrity, RDS' have the possibility to express explicitly consistency-constraints in form of program-assertions in the catalogue. Those assertions are usually SQL-clauses with built-in consistency-verification components. The assertion, create assertion salary
        check (not exists (select * from employee A,
            employee B
            where A.salary>B.salary
            & A.rank<=B.rank))

e.g., limits the tuples of a database to those in which the salary of a new employee is never higher than the salary of his chief-officer. Coupling those definitions to SQL has the disadvantage of taking over the lack in expressive power. There is no way to model recursive constraints as already mentioned. The tuples in the example are required to have a specific ranking order. This was modeled by the explicit field "rank". Supposing that no such ordering exists, then this type of constraints cannot be implemented. If the database is large enough, then defining such ranking fields becomes a very tedious task. The only solution in such cases lies in external procedural programming efforts, which allow the possibility to iterate tuples and arrange them in the required order.

In the catalogue there resides not only the definition of those constraints, but also their way of implementation. Actual RDM-environments provide the possibility to describe strategies of constraints-check realizations in three ways: transaction procedures, triggers and predicates. Transaction procedures are basically indivisible operations implementing a specific task. They are only valid as a whole and thus the herein specified constraints are guaranteed either to be satisfied or not. Triggers are automatic verification procedures which are executed when special predetermined events occur whereas predicates represent consistency criteria, verified globally by the database.

Constraints Verification Methods

If large quantities of data are imported into a database the problem of constraints activation occurs. This is because insert- and delete-operations affect referential integrity. In SQL the CASCADE-function guarantees the elimination of all orphan-tuples, i.e., all tuples in auxiliary tables with non-existent key entries in base-tables. This CASCADE-function has to be, however, coupled to one of the above-mentioned verification strategies. FIG. 2. shows the usual SQL-command flow. After syntactic and semantic processing (1) and (2), the optimization phase starts. The basic idea is to eliminate as many SQL-commands as possible (c.f. Query Graph Model and & IBM Research-Report RJ-6367, IBM Almada, San Jose, Calif., August 1988). Plan optimization (4) completes this process by using real file organization parameters to guarantee the best possible realization. In case that there are constraints available, the constraints compiler (6) will generate the required machine code representing those constraints. The present invention reforms the command flow shown in FIG. 2 heuristically.

Some realization methods (c.f. EP0726537A1) substitute the regular SQL-compiler which is activated when INSERT commands are encountered with another one. The modified compiler generates a SELECT-clause before the INSERT-machine-sequence in which all tuples failing to satisfy the constraints are contained. This guarantees referential integrity. The here described invention substitutes the constraint compiler with a constraints-query-generator, which is responsible of formulating constraint-checks as logical queries to the deductive database of the catalogue.

Deductive Databases

The problem of constraints expression and verification can only be handled with sufficient generality in the context of logical programming (LP). The fact that referential integrity is only one sort of possible variable assignment of a logical program—thus a common special case—makes it irrelevant which type of integrity constraints are modeled when LP is used. Deductive databases are generally described in a declarative manner and are in the same time sound and complete logical solutions of problems encountered in databases. A well-known deductive-database language is DATALOG. It is a limited predicative language without functions or negations. DATALOG is the best way in LP to express databases. The RDM does not contain complex objects on the tuple-level which require (or can be compared to) function definitions. In the same time the implementation of "negation as failure" to find a tuple in the finite mini-world of a database, corresponds to the same assumption in DATALOG. There, it is the guaranteed minimal semantic model which makes it possible. In order to explain the present invention correctly, we will use the DATALOG-formalism: Formal definitions will be indexed with the subscript Def. whereas language notations will be marked with N.

N. 1: An intensional database (IDB) is the set of all tuples of a database which can be deduced from an extensionally existent set (EDB).
    N. 2: The rule-definition language is a language which enables the formal description of IDB.

This language must allow the possibility to express logical connections between assertions about database-objects. Generally it must satisfy the following criteria:

A. Recursive definition of rules
    B. Negation and
    C. User defined functions must be allowed Therefore, it is a reduced version of the horn-clauses-based PROLOG. (c.f. Chang, C. L.; Lee, R. C.: Symbolic logic and mechanical theorem proving, Academic Press, 1977 Edition, 1973 and Sterling, Leon; Ehud, Shapiro, The Art of Prolog, MIT Press series in logic programming, 1986).

Def. 1: Literals are negative or positive assertions.
    Def. 2: Horn-clauses are rules of the form: $Q \mathfrak{R} A1 | A2 \ldots | An$, where Q and Ai are non-negative literals.
    Def. 3: A rule of the form $Q \mathfrak{R} A1 | A2 \ldots | An$ is called definite, if Q and Ai are atoms (for all Ai).

One well-known rule-definition language is DATALOG (c.f. Ullman, Jeffery D., Principles of database & knowledge-base systems, Volume I&II, Computer science press, 1988). DATALOG is a language without function symbols, which however has dialects allowing such extensions (for example $DATALOG^{fun}$, $DATALOG^{neg}$). The syntax of DATALOG contains the following elements:

| | | |
|---|---|---|
| A. | constants | a, b, c, d . . . |
| B. | variables | x, y, z, . . . |
| C. | predicates | R1, R2 . . . |
| D. | logical operators | $\int$, $\mathfrak{R}$ |
| E. | equality relations | =, <, > . . . |
| F. | punctuations | ,, ",", "." |

Formulas and rules can be expressed using (recursively) the symbols from A to F.

Def. 4: A term is either a constant or a variable.

Def. 5: An Atom is an expression of the form P(t1, t2, ... tn), where P is an n-ary predicate and ti are terms. The set of all atoms is written A.

Def. 6: A ground-term is a term without variables.

In a rule Q ℜ A1|A2 ... |An, Q is called a conclusion (head) and Ai premises. Each Ai is a sub-goal and the overall conjugation is called goal (body).

Def. 7: A DATALOG-rule contains only atoms. It is called recursive if the conclusion (or equivalent terms) is also contained in the premises. It is called linear recursive if it is contained only once.

Def. 8: A DATALOG-rule of the form: Q ℜ, where Q is a ground-term is called a fact.

Examples of DATALOG-rules are:
ancestor(x,y) ℜ ancestor(x,z), father (z,y). or
ancestor(x,y) ℜ ancestor(x,y),ancestor(z,y).

The first is linearly- and the second non-linearly recursive

Def. 9: A DATALOG-pro grain is a set of DATALOG-rules.

The semantics of DATALOG-programs is either declarative (model-based) or procedural (proof-based). In what follows the model-based variant is described.

Def. 10: An interpretation of a DATALOG-formula is a tuple (D,PA,CA), in D is a domain, CA a function from constants to elements of the domain. PA a function from n-ary predicates (D n) to the set {true, false}.

Def. 11: A variable assignment Π (in a particular interpretation) is a function which gives each variable in a DATALOG-formula an element of the domain D.

Thus, an interpretation and a variable assignment determine the truth-value of a DATALOG-formula.

Def. 12: A model of a DATALOG-pro gram is an interpretation in which all rules and facts have the value "true", i.e.:
1) For all tuples (t1 ... tn), which are in the relation P, P(t1 ... tn) is "true".
2) For all rules and all variable assignments Π, if π(A1| ... An) is "true" (i.e., all premises Ai of a rule are true), the conclusion is also "true".

A model is a set of predicate instances which contains all the tuples of the intensional database. Since in general there are many models of a logical program, only the minimal model is identified with its semantics. Van Emden, Kowalski (The semantics of predicate logic programming languages, Journal of the ACM, October 1976) provides a proof of the existence of such a mode.

Def. 13: The canonical, declarative semantics of a DATA-LOG-pro gram is (only) the set of all predicate-instances which can be deduced from the program. This set is called the minimal model of the program.

This definition implies a model-generation procedure. It simply constitutes applying the rules on the facts until no new facts are generated. This procedure is called naive ground-term completeness procedure and presents the focal point of the present invention.

Logical Ground-Term Completeness

Usually rules and datasets of a logical system have to fulfill criteria of soundness and completeness. Soundness means that rules generate only correct facts. Completeness (in the context of this invention) means that axioms and rules are able to deduce all possible facts explicitly. This is accomplished using the following so-called naive-completeness:

| Alg.1 (naive ground-term completeness): |
| --- |
| Input: A function-free, definite and finite logic program (with DATALOG as a rule-definition language). |
| Output: The full extension of all deducible formulas in D (written ext(D)). |
| Step 1: M=All facts in D. |
| Step 2: Repeat |
|     Step 2.1    Set Mold=M; |
|     Step 2.2    For each rule Q ℜ A1 | A2... | An ; Begin |
|         Step 2.2.1    Calculate each assignment Π, so that π(A1 | A2... | An) is "True" in M; |
|         Step 2.2.2.    If Π(Q) | M, append it to M. |
|         End |
|     until (M=Mold) |

Two important drawbacks of this algorithm are the uncontrolled repetition of deduction-steps and the generation of the extensions of all the relations.

Def. 14: A premise Ai of a rule Q ℜ A1|A2 ... |An is called a pattern if there exists at least one fact and an assignment Π so that F=Π(Ai) (Aiis said to unify F).

Proposition 1: Supposing that each pattern of an average rule Q ℜ A1|A2 ... |An unifies m facts of ext(D) on the average, then the complexity of Alg.1 is of order $O(m^n)$.

Proof:

The calculation of all variable-assignments Π in Step 2.2.1. needs an algorithm which builds the intersection-set of the Ais (in A1 ∧ A2 ... ∧ An). The complexity of this algorithm is $c_1 * m^n$, where $c_1$ is a constant (c.f. Knuth, *the art of computer programming*, Vol: *Searching and Sorting*, page 391).

Step 2.2.1. is not the only blocking step in Alg.1. The search process in 2.2.2. is also very complex if no sorting order is assumed. A new fact is only added to the iterative process if the whole database was searched for. Supposing there are k new facts and t exist in the database a priori, then there are always k*t comparisons necessary to accomplish this task.

Even worse is if k increases. Then this expression becomes
$t+[1/a_0]*k*t+[1/a_1]*k*t+ ... +k*t$ where a0,a1 ... etc. are coefficients which depend on the logical form of the program. This form determines which "portion" of k is generated in which step.

In spite of those problems Alg.1 remains a very safe way to generate the minimal model of a DATALOG-program. This, because of the following property:

Proposition 2: Alg.1 terminates always (if given a correct input).

To prove this property some more definitions and a proposition are needed.

Def. 15: The Herbrand universe of a logic program ($U_p$) is the set of all ground-terms which are constituted using constants and function symbols in P.

Def. 16: The Herbrand base of a logic program $B_p$) is the set of all ground-atoms which are constructed using predicates from P and ground-terms from $U_p$.

Def. 17. A Herbrand interpretation of a logic program is any subset of $B_p$.

Def. 18: A Herbrand interpretation I is a Herbrand model of a definite logic program iff all definite clauses in P have the value "true" in that interpretation. A definite clause has the value "true" in I iff at least one premise is "false" or the conclusion is "true". An atom A has the value "true" in I. iff A is contained in I—otherwise it is "false".

The Herbrand universe of P, which has only a constant {0} and the function {s}, is: {0,s(0),s(s(0)),s(s(s(0))) ... }. Supposing, that it contains the predicate ,,>,,, then we have {>(s(0),0),>(s(s(0)),s(0)),>(s(s(s(0))),s(s(0))) ... }.

In the example $U_p$ and $B_p$ are infinite. If no function symbols are permitted, then $U_p$ and $B_p$ are both finite.

Proposition 3: The Herbrand base of a definite, function free and finite program P is finite.

Proof:

From the finiteness of P and the fact, that it is function free follows that the Herbrand universe is also finite. Since there are only finitely many predicates, $B_p$ must be finite.

Proof of Proposition 2:

Suppose that Alg.1 doesn't terminate. There exist chains of ground-terms which either contain infinitely many new terms or repeatedly the same. Since $B_p$ and $U_p$ are finite, the first possibility is discarded. But Step 2.2.2. prevents the second possibility from occurring, i.e., Alg.1 terminates always.

Alternative Methods of Ground-Term Completeness

In (Bancilhon, F.; Maier, D.; Sagiv, Y.; Ullman, J. D.: Magic sets and other strange ways to implement logic programs, Proc. ACM SIGMOD-SIGACT Symp. of principles of database systems, Cambridge (Mass.), 1986), (Bayer, R.: Query Evaluation and Recursion in Deductive Database Systems, Manuscript, March 1985) or (Lozinskii: Evaluation queries in deductive databases by generating, Proc. Int. Joint Conference on A.I., 1985) several alternatives to this naive completeness are shown to exist. They either concern the inference process itself, i.e., the way in which the rules are to be applied or the calculation of the relevant facts. A method which is suggested to enhance the inference is the semi-naive ground completeness method. It tries to suppress undesired repetitions of fact generations (Step 2.2.1 in Alg.1) by only taking the incrementally generated facts into account (compare Bancilhon, F.; Ramakrishnan, R.: An amateur's introduction to recursive query processing, Proc. of the ACM SIGMOD-SIGACT Conference, Washington D.C., May 1986 and Chang, C. L.; Gallaire, H.; Minker, J.; Nicholas, M.: On the evaluation of Queries containing derived relations in relational databases, Advances in database theory, Vol. I, 1981, or Marq-Puchen; Gallausiaux, M.; Jomien: Interfacing Prolog and Relational Database Management Systems, New applications of databases, Gardavin and Gelaube eds. Academic Press, London, 1984).

The hypothesis is, that $\Delta R_i = (R_i[F(R_{i-1}[\Delta R_{i-1}]))-R_i$ for each relation $R_i$ ($\Delta R_i$ is the incremental change of $R_i$ and $F(R_i)$ the functional form, deduced from the body of a rule). Generally $\Delta R_i$ cannot only be calculated in terms of $AR_{i-1}$. In case of linear recursion, however, this is possible, because $$F(R_{i-1}[\Delta R_{i-1}]) = F(R_{i-1})[F(\Delta R_{i-1}) = R_i \Pi F(\Delta R_{i-1}).$$

Thus, the semi-naive method is only valid as long as the programs are linearly recursive. In this case, they provide a good alternative for Alg.1. It is interesting to note that the complexity of the intersection $A_1 | A_2 | ... | S | ... A_n$ is reduced by reducing the number of facts which unify (in average) with S. All other intersections must still be performed. But this was the most important drawback of Alg. 1 (Proposition 1).

The so-called APEX-procedure is a method of the second type, i.e., the facts relevant to a query q? are generated before the actual completeness algorithm starts. Those facts are calculated using so-called rule system-graphs which contain all logical connectives between rules of the program. They are coupled with a query generation process which produces several new queries q1?, q2? . . . depending on whether it encounters AND connectives or not. The generation is accomplished using side-way information passing (SIP) between the query (or the queries) and the facts in the AND-connectives. Another method of this class is QSQ (c.f. Vieille, L.; Recursive axioms in deductive databases: The Query-Subquery approach, Proc. First Int. Conf. on expert database systems, Kerschlag ed., Charlston, 1986). There, rules are used to generate queries. Relevant facts are deduced using backward chaining in a way similar to PROLOG. In case of recursive predicates, queries are produced using SIP with actually existing facts. The real difference between APEX and QSQ on one side and semi-naive completeness on the other is, as stated above, that the semi-naive method addresses the problem of optimizing the inference process itself whereas the other two methods try to reduce the complexity by reducing the amount of relevant facts.

Magic-sets (c.f. Been, C.; Ramakrishnan; On the power of magic, Proc. sixth ACM SIGMOD-SIGACT Symp. on principles of database systems, San Diego, Calif., March 1987) is a modification of QSQ in which adornments (i.e., variable assignments) are either added to the program in form of new (magic) clauses or to the right side of a clause in form of restrictions. Starting with the goal-clause, a new set of predicates is generated. Using SIP, adornments are passed successfully. The result is a new modified version of the logic program which is then executed using naive- or semi-naive completeness. In some cases magic-sets can provide very fast alternatives as in the case of the following program:

anc(X,Y) ℜ par(X,Y).
anc(X,Y) ℜ anc(X,Z)|par(Z,Y).
and the query
q(X)←anc(a, X).
The new magic program is:
magic (a).
q(X) ℜ anc(a, X).
anc(X,Y) ℜ par(X,Y).
anc(X,Y) ℜ magic(X)|anc(X,Z)|par(Z,Y).
magic(Z) ℜ magic(X)|anc(X,Z).

The magic predicate contains a restriction to variable-assignments and might be thought of as a strategy with which constants are tied together.

Semantic Considerations Concerning the Meaning of a Variable in the RDM

There exist many DATALOG-based methods for constraints-verification. The central problem is the reduction of complexity within rule execution. Solutions try mainly to generate instances of the rules first, before an adequate constraints-application starts. The fact that many approaches to solutions through variable instances achieve a high degree of efficiency requires a discussion of the meaning of a variable in the closed world of a deductive database and an RD model. The meaning of a variable, which is common in mathematical logic (and therefore in logical programming), is to consider it as an entity independent of the domain of the application. Thus, the link between a variable instance and the domain is unclear, since there are no explicit or implicit rules in the semantic interpretation of the formulas for the description of these instantiation procedures. This link is thus left to the implementation of a logical machine, which can lead to considerable problems.

DE19725965C2 solves this problem by the introduction of the Herbrand-abstraction structure. Here, variables are considered as abstractions of terms and conceptual relationships in the catalog level. This approach makes it possible to describe alternative completion methods that make it possible to get from a standard Herbrand-interpretation to a "more complete" one by means of an arbitrary degree of abstraction. Reversing the "abstraction process", i.e., if one starts with the un-instated clauses, the Herbrand-abstraction structure allows procedures to divide the clauses of a logical program into a set of "more instantiated" clauses. This in turn leads to the efficiency enhancement (linearization) described there. However, the method formalized in Alg. 2 in DE19725965C2 does not provide a concrete method for optimizing the instantiation of the rules. This could be achieved in a Herbrand-abstraction structure using various ways. Furthermore, the main weakness in the use of the Herbrand-abstraction structure is that it represents an exponential search space in the worst case.

Solution to Problem

The method presented here leads to complete evaluation methods using a new representation of variables as abstracted from the classical truth table, also called pattern character strings or pattern-trees. In contrast to the prior state-of-the-art resolving methods, these lead to small search spaces in which linear processing times of inputs are realized. The term "inputs" in this case always means instantiations of logical formulas. To generate the extension, a method is used that solves pattern-trees instead of clauses. In this context, two types of resolutions of formulas/clauses (also referred to as Solvers) are known: complete and incomplete.

A solver is called complete when it can establish both, that a formula is satisfiable and that it is unsatisfiable. Not all formulas that can occur in a Solver formula fall into the same category. In practice, there are generally three categories:

Random: Formulas generated randomly by a schema called "fixed clause length model" (one only specifies the number of variables and clauses, and how long a clause should be, the rest is randomly generated)

Crafted: Formulas derived from difficult combinatorial problems, such as graph coloring Application: Formulas derived from applications in reality (e.g., circuit verification)

Not all solver paradigms are just as good with all types of formulas. There are four types of Solver which are shown here. To ensure a clear overview of today's methods, each type is characterized by the following features:

Randomization, completeness, algorithm class, search strategy, variable selection heuristics, value selection heuristics Terminologies:

Branch and Bound: Method of Operations Research (OR), in which a combinatorial optimization problem (finite number of independent variables with a discrete set of values) is not accessible to effective analytical treatment or to enumeration methods (decision tree methods) If the problem can be formulated using n discrete variables which can assume k possible values, then it is a qualitative decision-making problem.

Approach: The solution method uses the principle of partitioning and limiting the solution space in order to dispense with a complete enumeration.

Steps:
a) Branch: One of the variables is assigned a certain permissible value, resulting in a new sub-problem, the size of which is one variable less. Fork possible values for the selected variable, k-"simpler" sub-problems arise. It remains to be determined which of the sub-problems contains the optimal solution.
b) Bound: After fixing a variable, it is determined how the solution for the remaining variables can fail. If one has determined the bounds for all possible values of a selected variable, one selects the alternative with the most favorable bound to go to the next branch. If a permissible solution is reached after multiple branching and bounding, all cases can be deleted with less favorable bounds. The optimum is achieved if a more favorable permissible solution is no longer to be expected.
c) Unit-Propagation: The formula is searched for unit-clauses. A unit-clause is a clause in which all variables except one are already used and the clause is not yet satisfied. Such a clause can only be satisfied if the last, unassigned variable is occupied so that the clause becomes true.

The four Solver types are now classified as follows:
1. DPLL/Look-Ahead
Named after Davis, Putnam, Logeman, Loveland (c.f. M. Davis, G. Logemann, and D. Loveland, A Machine Program for Theorem Proving CACM, 5 (7): 394-397, 1962) DP resolution), then DLL, also DPLL.
Randomized: No
Complete: Yes
Algorithms class: Branch-and-Bound (chronological Backtracking)
Search strategy: Systematic, binary search tree
Variable selection Heuristics: VAR, selects a variable to be used next (decision).
Value-selection Heuristics:
    VAL, selects the value to be assigned to this variable first (direction).
    Variable assignment+unit propagation (=Branch).
    Conflict (as one of the clauses becomes empty) (=Bound): Undo assignments. Decision variable in other direction, if possible, otherwise backtracking.
    If backtracking is required for the very first variable: Formula can be satisfied.
The quality of a branch-and-bound method depends essentially on the selection of the bounds. This selection can only be done heuristically; it is therefore not possible to make statements about the convergence of the algorithm. The main disadvantage of DPLL is, however, the potentially exponentially large search tree and the fact that it only works well with special types of formulas (c.f. Table 1 further down).
2. SLS
Named after: Stochastic Local Search (short SLS, c.f., e.g.: Balint, A., Fröhlich, A.: Improving stochastic local search for SAT with a new probability distribution. In: SAT-2010. LNCS, Vol. 6175, pp. 10-15 (2010))
Randomized: Yes
Complete: No
Algorithms class: Las Vegas Algorithm (Randomized algorithm, which always produces one correct result when it terminates)
Search strategy: Randomized, optimization of a target function (objective function)
    a. Choose randomly an assignment $\alpha$
    b. Verify if a(F)=1. If yes: End.
    c. In case no: $U=\{c|c\varepsilon F: \alpha(c)=0\}$. Chose $u\varepsilon U$ randomly
    d. In u, chose one of the literals, respectively, i.e., the associated variable (PICKVAR) via 'objective Function'
    e. Invert the assignment (FLIPVAR) and go to b.

The variable selection heuristic PICKVAR selects a variable by means of an 'objective function', which is to be optimized.

Variant 1: Minimize the number of unfulfilled clauses (consider all variables in u and flip the assignment where |U| is minimal after the flip)

Variant 2: Minimize the number of clauses unsatisfied by the flip.

Disadvantageous is that if Variants 1 and 2 get into a local minimum they become very inefficient. The only solution to this is randomization (random flips). Also, it cannot be determined whether assignments were previously queried already. The biggest deficit of SLS lies in the incompleteness of the method.

3. MP

Named after: Message Passing, Approach motivated by statistical physics (Ising Model, c.f. W. Gropp, E. L. Lusk, N. Doss, and A. Skjellum. A High-Performance, Portable Implementation of the MPI Message Passing Interface Standard. Parallel Computing, 22(6):789-828, 1996.)

Randomized: Yes
Complete: No
Algorithms class: Message passing
Search strategy: Randomized, clauses and variables negotiate the assignment (factor graph)

A clause queries variables for the probability of their acceptance of a favorable assignment The worse the overall situation for a clause becomes, the more the clause requests the respective variables to change their values Claims (clauses of variables) and consent (variables to clauses) are interpreted as messages Clauses only talk with the variables whose literals they contain. Variables talk with all clauses in which they occur (bipartite graph with two edge types: factor graph)

When all agree (no changes in the news): allocate variables with the strongest bias It is possible that MP converges, but all variables have a bias near 0. In this case, for example, SLS assigns the remaining variables randomly, so that a satisfiable assignment is produced. Furthermore, MP may not converge, or MP may converge, and non-trivial biases may arise, ending in a conflict. MP works very well on satisfiable large (variable number >100000) random formulas with ratio to the 4. 2 (clauses/variable ratio).

Disadvantageous is that MP cannot determine whether a formula is unsatisfiable or not (it is therefore incomplete).

4. CDCL

Named after: Conflict Driven Clause Learning, (c.f. E. Goldberg and Y. Novikov. BerkMin: a fast and robust SATsolver. In Design, Automation and Testing in Europe Conference, pages 142-149, March 2002)

Randomized: No
Complete: Yes
Algorithms class: Backtracking (not-chronological, =Backjumping)
Search strategy: systematic, clause learning to improve Unit Propagation (UP)

VAR and VAL (same as DPLL).

Variable assignment and check whether UP ends in a conflict (c.f. DPLL).

Construction of a search tree, however, not using recursion.

Decisions are counted and stored as well as all assignments deduced using UP.

If the algorithm is in conflict, it analyzes it by means of a conflict graph (FirstUIP).

This creates a new clause which is inserted into the formula.

After that, backjumping takes place, in such a way that the new clause is a unit-clause.

Disadvantageous is, as already mentioned for DPLL: Potentially exponentially large search tree, performance increase only with special formula types (c.f. Table 1 below).

All four Solver methods can be characterized by the following features and are therefore significantly different from the method according to the invention presented below:

1. They are an example of the application of Tarski's semantic truth concept to formulas of mathematical logic. In principle, this understanding prescribes that variables exist separately from their meanings or values. These meanings are substituted in the formulas, so that these are satisfied. Thus, variables (and their corresponding literals) are considered containers, which do not allow structural information to be derived from the data stored in them.

2. The byproduct of this view is that algorithmic methods must necessarily test different variable assignments before they find a valid one. The concept of a variable evaluation is therefore an integral part of those methods.

3. Information from the concrete mathematical-logical formula concerning the alignment of used variables (literals) and their reciprocal interactions is not applied or only inadequately applied (usually in the form of heuristics) in order to find a valid assignment.

4. All methods avoid the construction of the entire combinatorial space because this construction is exponential in terms of the number of variables. Since the methods use variable assignments iteratively, only a part of the space is constructed in each iteration, the formula is evaluated thereon, then the next iteration is started, and so on.

5. The fact that the methods do usually not use generic heuristics, their performance is strongly dependent on the type of the formula (Table 1). "Good", "bad" and "neutral" are rough indicators of the expected performance of a method based on a given type of formula. "SAT/UNSAT" stands for "satisfying" or "un-satisfying":

TABLE 1

| Category | CDCL | Look-ahead | Message-Passing | SLS |
| --- | --- | --- | --- | --- |
| Random SAT | bad | neutral | good | good |
| Random UNSAT | bad | good | bad | bad |
| Crafted SAT | good | neutral | bad | neutral |
| Crafted UNSAT | neutral | neutral | bad | bad |
| Application SAT | good | bad | bad | bad |
| Application UNSAT | neutral | bad | bad | bad |

Finally, a solver method is known that corresponds to the classical truth table method. It differs from the above-described methods in points 4 and 5 as follows:

1. An integral part of the method is the construction of the entire exponential space of all combinations of variable values. After this space has been constructed, one can efficiently determine whether or not a particular variable assignment for the respective formula results in 'true'.
2. This efficient determination, unlike all other methods, does not use the replacement in the original formula, but the simple search in the generated space, i.e., in the truth table. This makes it possible to find the truth-value of the instantiated formula without using the classical logical operators (AND, OR, NOT), since the full extension of these operators, applied to the logical values 'true' and 'false', is already materialized.
3. In the worst case, the number of variable assignments that must be passed through until a valid value is found is exponential. This potential exponentially is the greatest disadvantage.
4. The performance is independent of the formula type.

Goal of the Invention

The objective of the invention is to optimize logical interrogation methods of relational database systems in their most general and complete form, while maintaining strict logic conditions such that the response procedure experiences linear efficiency in terms of speed and memory requirements.

Nature of the Invention

The invention is based on the objective of creating a method of the type mentioned above which optimizes relational database systems in their most general and complete form in their query procedures in such a way that the response procedure undergoes an efficiency increase in terms of speed and memory requirements without giving up any logical condition. This object is achieved by methods described in the Patent Claims 1-13.

Example of Accomplishment

Extending the RDM with the Concept of a Logically Complete Terminology System

The process underlying the current invention is based upon the idea of constructing a RD-meta-level containing all terminological, logical and application-relevant data in their most complete extension. In this way a very general form of constraints handling is reached, because the constraints can then be expressed in a pure logical (declarative) form. The following example illustrates this procedure: Suppose we have a printing-machines database. This database will contain the tables "machines" and "company" (as in FIG. 3). The table "machines" contains—among others—the field "machine-type" and "printing-group". Those are of special importance, because their combinations model known constraints in the printing-machine industry. E.g., no "polar" machine can be 5-colors, since Polar produces only cutting machines and their accessories. Similarly, a "Heidelberg-Tiegel" never exceeds two colors, so that the tuple <type="tiegel", group="3-colors"> is inadequate. If one tries to express those constraints in general DATALOG rules (as is the case in most approaches) one faces the problem of having to define the rules in the facts-nearest way, because they barley have general validity. The combination <type="tiegel", group="3-colors"> is as absurd as <type="tiegel", group="5-colors"> and only <type="tiegel", group="2-colors"> is correct. Most logic-based solutions lead to non-monotonic inference-mechanisms and are thus both very complex to realize and principally incomplete. The method in patent DE19725965C2 is based upon generating all legal combinations of facts a priori and storing them in the catalogue. When this is done two goals are attained:

1. Strict terminological control, i.e., no field-values are allowed other than those known to the system
2. The ground-terms relate exactly to each other as expressed by the relations which are listed in the catalogue In contrast to DE19725965C2, an efficient fact search space is built up by introducing new resolution methods. FIG. 4 shows the new method of an SQL clause processing:

The queries compiled in point (6) are verified in (7). If the result of the search was positive, the command sequence continues as usual. Otherwise, a system alert (8) will be issued. In this case the term combination is invalid. For example, in the above database, the query generator would compile the fact "has_group (polar, 5-color)" when data input (type="polar" and group="5 colors"). This proves to be non-existent and switches on the warning process in (8).

The following steps illustrate aspects of the invention with reference to the FIGS. 5A and 5B.

Step 1: The database query is translated into clauses. This is done using known methods.

Step 2: Used literals are converted into pattern trees (pattern strings) each representing the multiple (called harmony) of a fundamental frequency of ones and zeros ("true" and "false"). These sample trees have a constant length independent of the number of variables.

Step 3: The pattern trees of different literals of a clause are joined by means of a special type of OR operation (called PatternOr) into a single binary tree, each corresponding to the clause.

Step 4: Pattern trees representing clauses are resolved by means of a special type of AND operation (called PatternAND). This new resolution method generates a binary tree (called a result tree, c.f. FIG. 5B), which can be transformed into a compiled decision tree for the logical theory. The most important feature of this latter tree is the fact that it completely replaces the truth table of the given clause set, i.e., a clause set is true exactly iff the value "true" can be inferred from this tree. The tree is used to find the entire truth-value of all clauses.

Step 5: Next, the tree processes the query (translated in instantiated formulas of the logic) such that only linear tree search procedures are necessary to find the truth-value. This factual value again represents—in the translation used—its output.

Determining the Truth-Value of a Query by Means of a Method for Processing Logical Pattern Trees Method 1:

The central method of this invention determines the truth-value of a formula by means of the steps outlined below (Patent Claim 1). The clause set represents any database query.

Step 1—Convert the query to clauses: In this step, known methods are used to get the logical representation of the query.

Step 2—Convert all literals to pattern strings: Suppose the following clause set corresponds to a query: $C=\{\{x0,x2\}, \{nx0, nx1\} \{x1,x2\} \}$ with N=3 (number of variables) and M=3 (number of clauses), then, as is known, the classical truth table is given in Table 2:

TABLE 2

| X0 | X1 | X2 | C1 | C2 | C3 |
|----|----|----|----|----|----|
| 0  | 0  | 0  | 0  | 1  | 0  |
| 0  | 0  | 1  | 1  | 1  | 1  |
| 0  | 1  | 0  | 0  | 1  | 1  |
| 0  | 1  | 1  | 1  | 1  | 1  |
| 1  | 0  | 0  | 1  | 1  | 0  |
| 1  | 0  | 1  | 1  | 1  | 1  |
| 1  | 1  | 0  | 1  | 0  | 1  |
| 1  | 1  | 1  | 1  | 0  | 1  |

The following method generates a list (called a pattern allocation list) that assigns a unique pattern string to each literal and its negation (c.f. FIG. 6).

The list is an array of all possible literals of the N variables (i.e., 2*N long) and each literal is assigned a string representing harmonies of ones and zeros. These harmonies are given by the equations described in the method. The literal nx0, for example, receives the pattern string: 2(1)2(0). In a pattern string, the factor $2^i$ is the pattern multiplication factor.

Method 2:

Construction method of a pattern assignment list for any N (Patent Claims 2-7):

Step 1: Start with an empty list

Step 2: for i=0 to N−1 a) Add a −ves literal, call it nX$<i>$ b) Assign to it the pattern string $2^i(2^[N-i-1](1)$ $2\hat{0}[N-1-i](0))$ c) Add a+ves literal, call it X$<i>$ d) Assign to it the pattern string $2^i(2^[N-i-1](0)$ $2^[N-1-i](1))$ Step 3—Execution of PatternOr-Operation: The pattern allocation list obtained by Method 2 is used to create pattern trees of clauses. For the creation of a logical pattern tree from a pattern assignment list, a logical operator (here called PatternOr) is necessary, which, unlike the classical OR, takes the pattern/sub-pattern multiplication factors and performs the same operations between sub-character strings having multiplication factors only once. If PatternOr is applied, e.g., between x0=4(0)4(1) and x2=4(1(0)1(1)), one has only to perform the following operations (c.f. FIG. 7):

a) The substring 4(1) is completely copied. It represents the right part of the result.

b) The substring 4 (0) is further processed recursively with half of 4(1(0)1(1)), i.e., the operation of PatternOr(4(0), 2(1(0)1(1))) is performed.

c) The expression in (b) may be reduced as follows:
PatternOr(4(0), 2(1(0)1(1)))=2*PatternOr(2(0),(1(0)1(1))) which means: The PatternOr
operator is applied to a half-long string, and then multiplied by a factor of 2, (i.e., the string
is concatenated with itself once) to achieve the same result as intended in b.

d) The string 1(1) is completely copied and represents the right part of the sub-chain.

e) PatternOr(1(0),1(0)) yields 1(0).

The steps required for PatternOr to generate a pattern string for C1 are: 2 copy steps (copying 4(1) and 1(1)), 2 divisions (called splits), where the string is divided in half, and finally two divisions/multiplication steps. It is clear that the above procedure is no longer dependent on N (or M) since it makes use of the harmonic representation of the patterns, regardless of their length.

Method 3:

Creating a logical pattern tree for clauses (Patent Claim 8):

It is assumed, 1. that the query has already been translated into clauses K$<a>$, $0<=a<=M$, 2. that pattern string of all literals of clause K$<a>$ (of the form K$<a>$={Xi, Xj, Xk} or K$<a>$={nXi, nXj, nXk}) has already been determined by means of the above method 2, 3. that the method adopts any such pattern string Z1 and Z2 upon input, 4. depending on how many literals exist in the clause (1, 2 or 3), the method is not used at all, or once or twice, and 5. that the method provides a pattern tree representing the result of the logical OR operation between the input pattern character strings of a single clause.

6. Use the string Z1 and Z2 in the following way:

Step 1: If both strings contain multiplication factors, then divide the largest factor by the smallest (let f be the smallest) and set PatternOr(z1,z2)=f*PatternOr (Z1/f,Z2/f), i.e., repeat Step 1 recursively with the reduced chains, where Z1/f is a string containing a multiplication factor divided by f. This is similar to Z2/f.

Step 2: If only one string (Z2, for example) contains a multiplication factor, split the other (Z1) into two halves (split operation). Set PatternOr(Z1,Z2)=PatternOr (Z1left,Z2/2) & PatternOr(Z1right, Z2/2). In other words: Repeat Step 1 recursively twice, using the left side for the first time and the right side of Z1 the second time. Link the result of the two recursions.

Step 3: If neither of the two string contains a factor, set Pattern (Z1,Z2)=PatternOr (Z1left,Z2left) & PatternOr (Z1fight,Z2right). Expressed differently: Repeat recursively Step 1 first with the two left sides then with the two right sides of Z1 and Z2. Link the result as above.

Step 4: If $Z1=2^x(0)$, the method is to output Z2 and terminate. If $Z2=2^x(0)$, then the method is to output Z1 and terminate.

Step 5: If $Z1=2^x(1)$, then the method is to output Z1 and terminate. If $Z2=2^x(1)$, the method is to output Z2 and terminate.

Method 3 was applied to two literals in FIG. 8, since sample clause C1 had only two. Assume, e.g., that C1'={nx0,nx1,nx3}, then FIGS. 9A to 9C show the process of pattern tree generation for C1' according to Method 3.

Method 3 is for the purpose of generating logical pattern trees, which are the clauses. From this point of view, the maximum number of steps of this method, which is necessary to construct the pattern tree of a single clause, is always constant since it is independent of the number of variables N and the clauses M.

Logic pattern trees obtained by Method 3 (PatternOr) have the following characteristics (c.f. FIGS. 9A to 9D):

1. They contain maximum k (in the Figure k=3) interleaved repeating character strings (called pattern symbols or symbols) which are provided with a repetition factor (multiplication factor). The root symbol [C$<i>$s3] in the Figure (called the basic symbol) represents the largest repeating string. Its substrings, which also repeat with a factor and are not leaves (called nodes or sub-symbols), are called [C$<i>$s2] and [C$<i>$s1] depending on their size. The number of unique, repeating, nested pattern symbols of a tree is called a repeat depth. The repetition depth of the sample trees obtained by process 3 is maximally k.
2. Leaves are harmonic repeats of ones or zeros.
3. Pattern symbols contain only the name of a single clause, <Ci>, since they are not links between clauses. This property is called the cardinality of the pattern symbols. The cardinality of the pattern symbols obtained by Method 3 is 1.
4. The branch depth (or simply "depth") of a logical pattern tree is the maximum number of branches—up to the leaves. A tree obtained by Method 3 therefore has a maximum constant depth of k which is independent of N or M. It is equivalent to the maximum repeat depth.

The next step is to show according to this invention how the pattern trees are used in order to realize the logical AND between the clauses. Similar to PatternOr, the following Method 4 (PatternAnd or Resolve) shows how this can be done. FIGS. 10A to 10B and 10C to 10D show the most important case differences of this method.

Method 4:
Creating a logical pattern tree for all the clauses of a logical formula (PatternAND or Resolve) (Patent Claim 9).
It is assumed,
1. that the query has already been translated into clauses K<a>, 0<=a<=M,
2. that logical tree trees representing each clause K<a> of the formula are already present by means of Method 3,
3. Method 4 is defined for arbitrary pattern trees Z1 and Z2 and not only for those which correspond to the individual clauses,
4. that the method is used M−1 times to achieve the final result. In each step i, the pattern tree (intermediate result number i−1) obtained up to then is resolved with the next clause Ci+1, and
5. that the method provides a pattern tree, which is the result of the logical AND operation between all clauses.

Use the string Z1 and Z2 as follows:
Step 1: If both strings contain multiplication factors, then divide the largest factor by the smallest (let f be the smallest) and set PatternAnd(z1,z2)=1*PatternAnd(Z1/f,Z2/f), i.e., repeat recursively Step 1 with the reduced chains, where Z1/f is a string containing a multiplication factor divided by f. This is similar to Z2/f.
Step 2: If only one string (Z2, for example) contains a multiplication factor, then split the other (Z1) into two parts (split operation, c.f. FIGS. 10B and 10D, case 1 and 3). Set PatternAnd(Z1,Z2)=PatternAnd(Z1left,Z2/2)&PatternAnd (Z1right,Z2/2). In other words, repeat Step 1 recursively twice, using the left and the right side of Z1 for the first time. Concatenate the result of the two recursions.
Step 3: If neither of the two strings contain a factor (c.f. FIG. 10C, case 2), then set PatternAnd(Z1,Z2)=PatternAnd (Z1left,Z2left)&PatternAnd(Z1right,Z2right). In other words, recursively repeat Step 1 first with both left sides then with both right sides of Z1 and Z2. Link the result as above.
Step 4: If Z1=2^x(0), the method is to output Z1 and terminate. If Z2=2^x(0), the method is to output Z2 and terminate.
Step 5: If Z1=2^x(1), the method is to output Z2 and terminate. If Z2=2^x(1) the method is to output Z1 and terminate.

FIGS. 12A and 12B show the result of PatternAnd applied to clause set C (also called the resolution result).

The essential practical difference between Method 3 and Method 4 (except that both logically perform different operations) is that input pattern trees that have constant depths in the case of Method 3 could have linear depths (in M) for Method 4. The most common case of a logic input tree for Method 4 is shown in FIG. 11A.

FIG. 11B illustrates the theoretical expansion of this tree, which can allow up to M^M (i.e., factorial many) symbols. Practically, it can be shown that the number of unique pattern trees generated by this method can remain polynomial in the number of literals of the query if literals are substituted appropriately.

This tree (called a general link tree, resolution result) has the following properties:
 a) All pattern symbols (including the basic symbol) are composed of symbols of several clauses, as opposed to clause pattern trees, because the tree corresponds to the logical links of these clauses. Their cardinality is therefore generally >1.
 b) The depth of a general link tree is linear in M.
 c) The cardinality of the basic symbol and all sub-symbols is maximally M.
 d) Leaves of the tree are independent pattern trees which have the same structure as that of the general link tree but have a maximal cardinality of M−1 (i.e., represent results of maximum M−1 clause linkages).
 e) Symbols of the tree (seen as sets of sub-symbols and leaves) are organized by means of an upward-bounded semi-order (related to their length). The upper bound is the $M^{th}$ base symbol, the lower bounds are the symbols with the cardinality 1.

Method 5: Creating a Decision Tree for a Clause Set (Patent Claim 10):
On closer examination of Method 4, it turns out that it permits a canonical division of the clause sets—as a by-product (c.f. FIGS. 12A and 12B). This division is the result of the execution of successive resolutions and is used to construct the logical decision tree. Moreover, it is possible to use lengths of the literals to provide appropriate ordering criteria for the efficient production of this tree which is made possible by renaming variables. FIGS. 12C and 12D show the transition from the result tree to the decision tree by means of an example given. To ensure this transition, the following procedure is necessary: It is assumed,
1. that the query has already been translated into clauses K<a>, 0<=a<=M,
2. that a resolution result for the clause set already exists,
3. that Method 5 recursively processes a pattern tree as input, and
4. that this pattern tree is initially equated with the resolution result.

Construct the decision tree as follows:
Step 1: Create a node (=K) in the decision tree. Create two nodes as left and right nodes for K (LK, RK).
Step 2: Consider the clause set of the top symbol in the pattern tree (=set) and compare them with the clause sets of the left (=LSet) and the right sub symbol (=RSet) in the same tree if the cardinality of these symbols is >=1. In the latter case, determine the variable which has disappeared from the lower clause sets. Insert this variable as the name of K.
Step 3: If left or right sub-symbols of the top symbol in the pattern tree have a cardinality <1 and the form 2^i(0), the left or right node (LK or RK) is 'false'. If, on the other hand, they have the form 2^i(1), then the same is 'true'.
Step 4: Determine the partial variable assignment, which makes the lower left set (LSet) and write it on an arrow, which goes out of the new node K left to LK Step 5: Repeat Step 4 for the lower right set (RSet).
Step 6: Set Pattern Tree=left lower tree of the current pattern tree, if LK is not 'false' or 'true' and call yourself recursively, otherwise stop.
Step 7: Set pattern tree=right lower tree of the new pattern tree, if RK is not 'false' or 'true', and call you recursively, otherwise stop.
Step 8: Insert the result of the left and the right recursive call, if they occur as left or right sub-nodes of the node K (at the position of LK and/or RK).

With regard to Step 4: If, e.g., the upper clause set was {X0,X2}{nX0,nX1}{X1,X2} and the lower was {X2}{X1, X2}, then write X0=0 on the left arrow which comes out of the node X0 (c.f. FIGS. 12C and 12D). Note that this assignment always contains only one variable, namely the one that was used as the name of the upper node.

Method 6: Finding the Entire Truth-Value of a Clause Set (Patent Claim 11):

The decision tree is used to find the entire truth-value of the clauses.

It is assumed,
1. that the query has already been translated into clauses K<a>, 0<=a<=M,
2. that a decision tree for the clause set already exists.

Find the truth-value as follows (navigation in the binary tree):
Step 1: Set the pointer to the base node in the tree.
Step 2: If this node is a leaf, terminate with the output 'true' or 'false' depending on whether the value of the leaf is 'true' or 'false'.
Step 3: If the node is not a leaf, call yourself recursively, first with the left, then with the right node.
Step 4: If the left or right recursive call returns the value 'true', then terminate the base call with the value 'true', otherwise terminate with the value 'false'.

Method 7: Use the Decision Tree to Process the Query (Patent Claims 12 and 13):

The last step is to use the generated decision tree. The following Method 7 describes the detailed procedure. FIGS. 12C to 12E illustrate, by means of the indicated decision tree and associated truth table, how the Method 7 described below is applied to concrete inputs.

It is assumed,
1. that a decision tree B has already been generated for the clause set,
2. that the query exists in the form of instantiated clauses K'<a>, where K'<a> is obtained from K<a>, by replacing all literals with values from the set {true, false}.

For the given input of the Turing machine find the truth-value as follows (navigation in the binary tree):
Step 1: Set the pointer to the base node in tree B.
Step 2: Read the name of the variable that was stored in the node.
Step 3: Determine the value of the variable in the input to be processed.
Step 4: If this value is 'true', use the arrow labeled <VariableName>='true' to go to the next node K.
Step 5: If this value is 'false', use the arrow labeled <VariableName>='False' to go to the next node K.
Step 6: When a leaf is reached in the tree, give the value of the leaf. This is the value that corresponds to the output of the Turing machine (relative to the given input).
Step 7: Else, set B=tree from B starting at node K.
Step 8: Call yourselves recursively.

DESCRIPTION OF THE DRAWINGS

The present invention may be better understood, and its numerous features and advantages made apparent to those skilled in the art by referencing the accompanying drawings.

FIGS. 10C-10D show another two case differences of creating a logic pattern tree for all the clauses of a logic formula;
FIG. 12E provides the corresponding truth table of the result- and decision tree;

Figure 1:
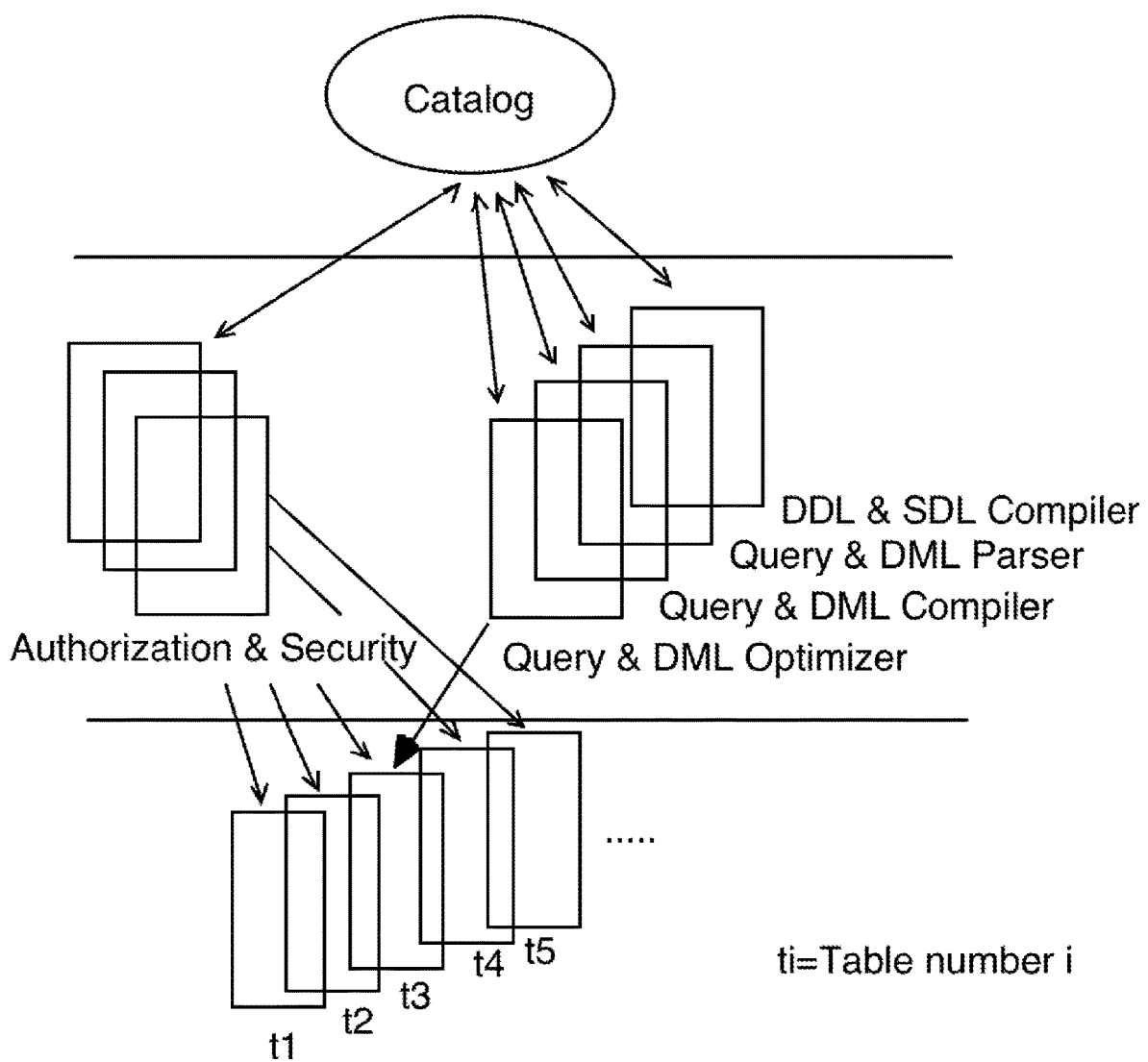
FIG. 1 shows the components of a real Relational Database Model (RDM) system where Tj (j=1 . . . n) stands for table names and arrows symbolize data transfer.
Figure 2:
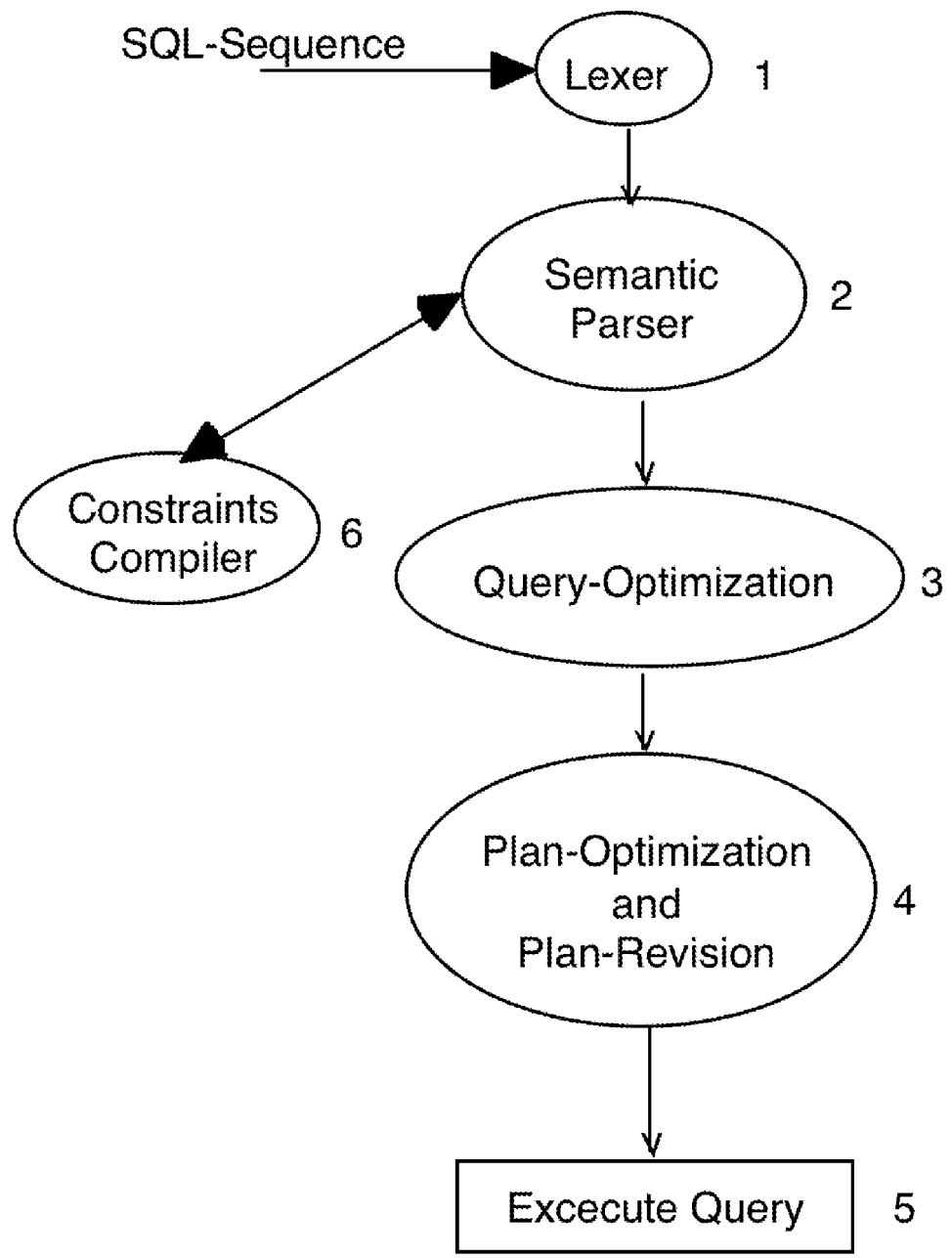
FIG. 2 shows the SQL-command flow.
Figure 3:
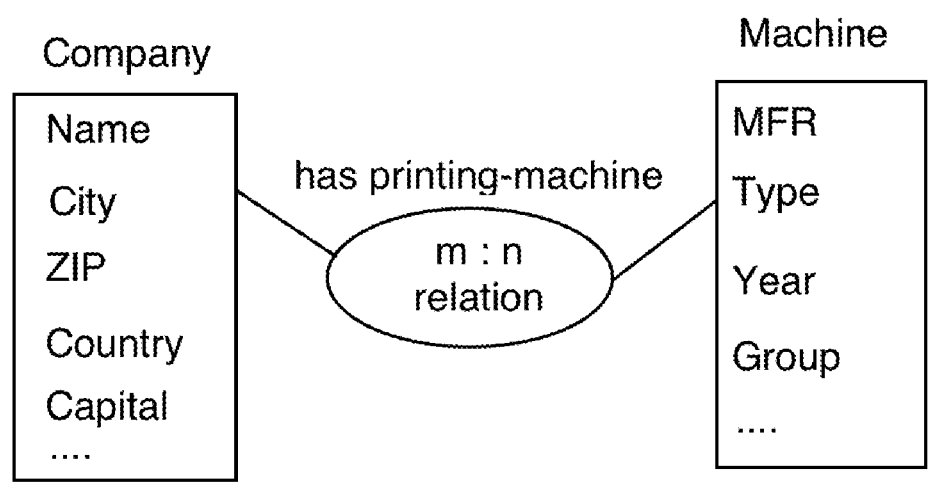
FIG. 3 shows typical database tables (ER-diagram)
Figure 4:
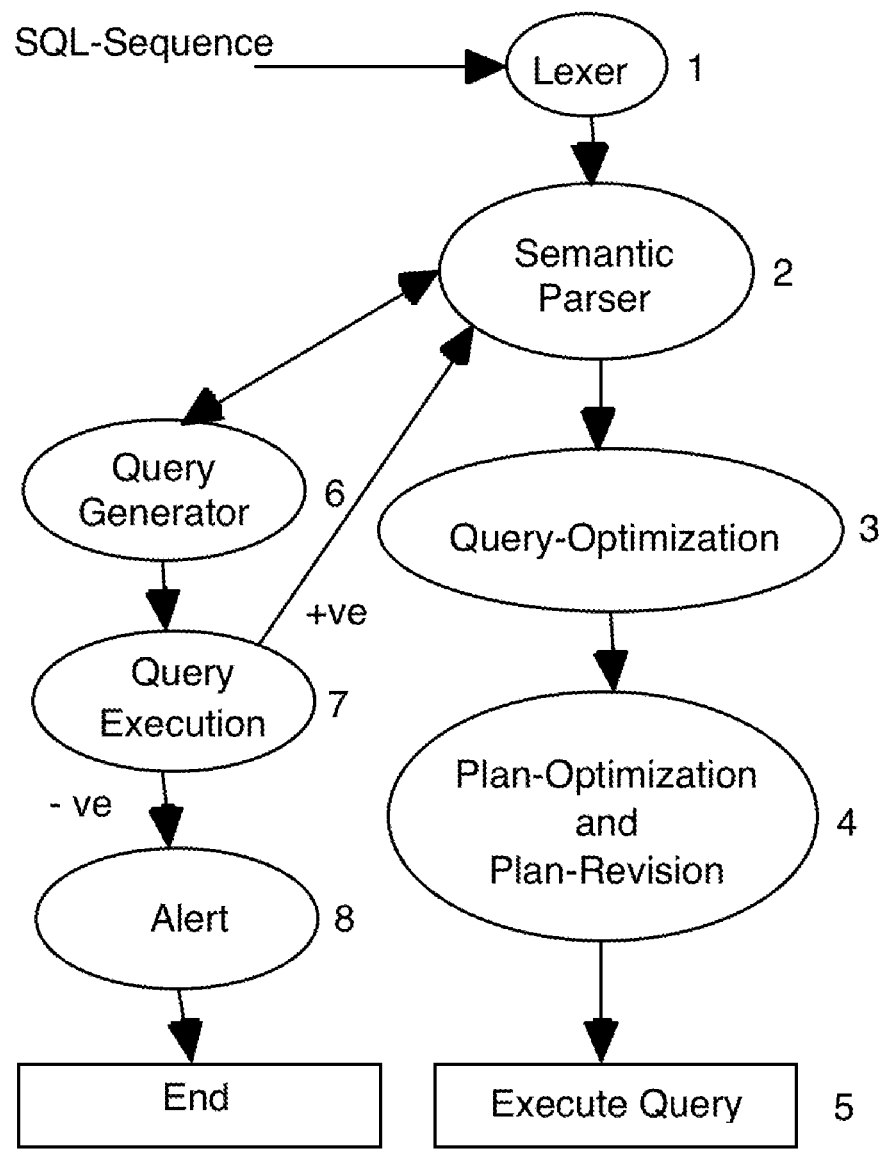
FIG. 4 shows the new method of an SQL clause processing.
Figure 5:
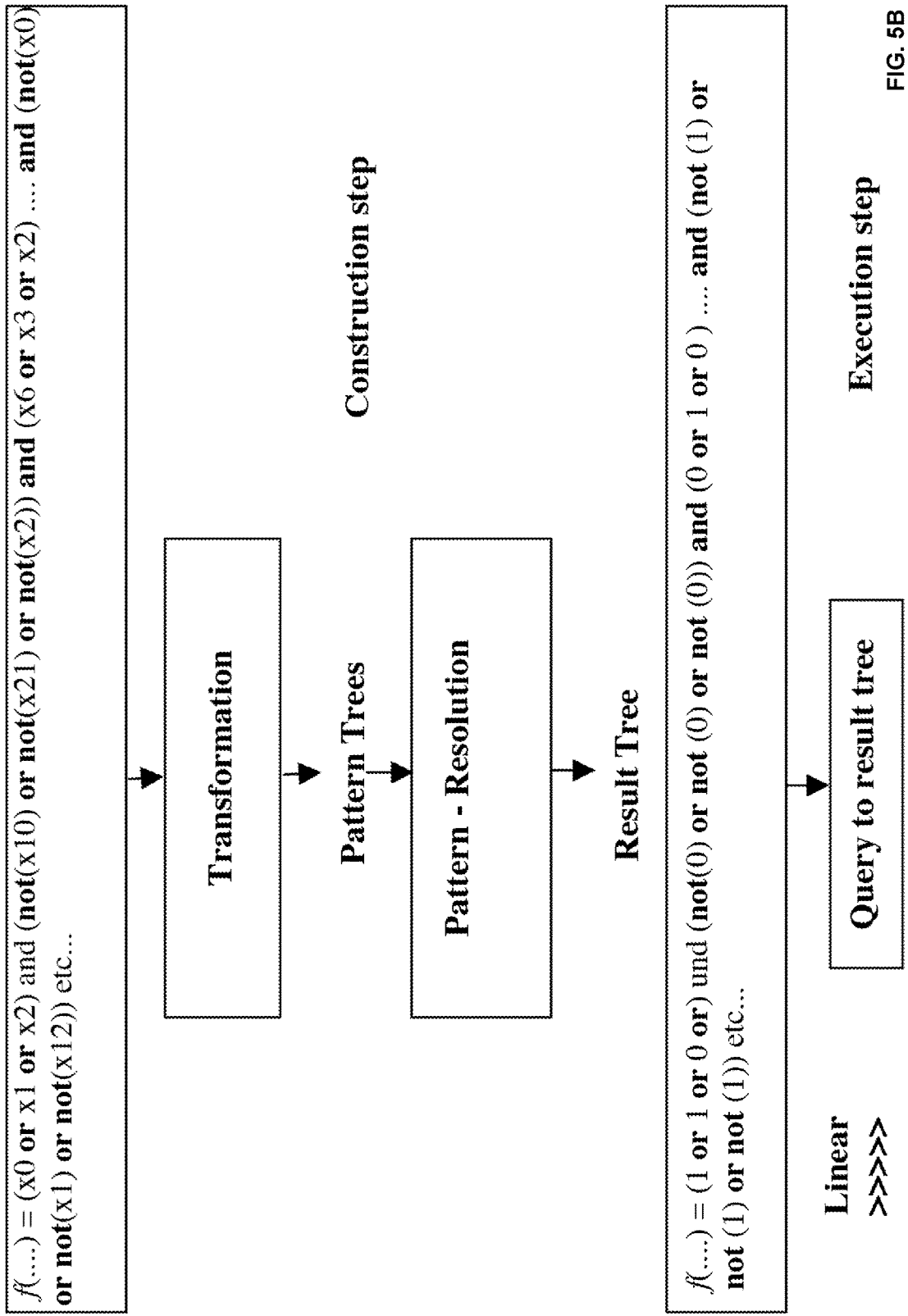
FIGS. 5A-5B provide an overview and illustrate overall aspects of the invention.
Figure 6:
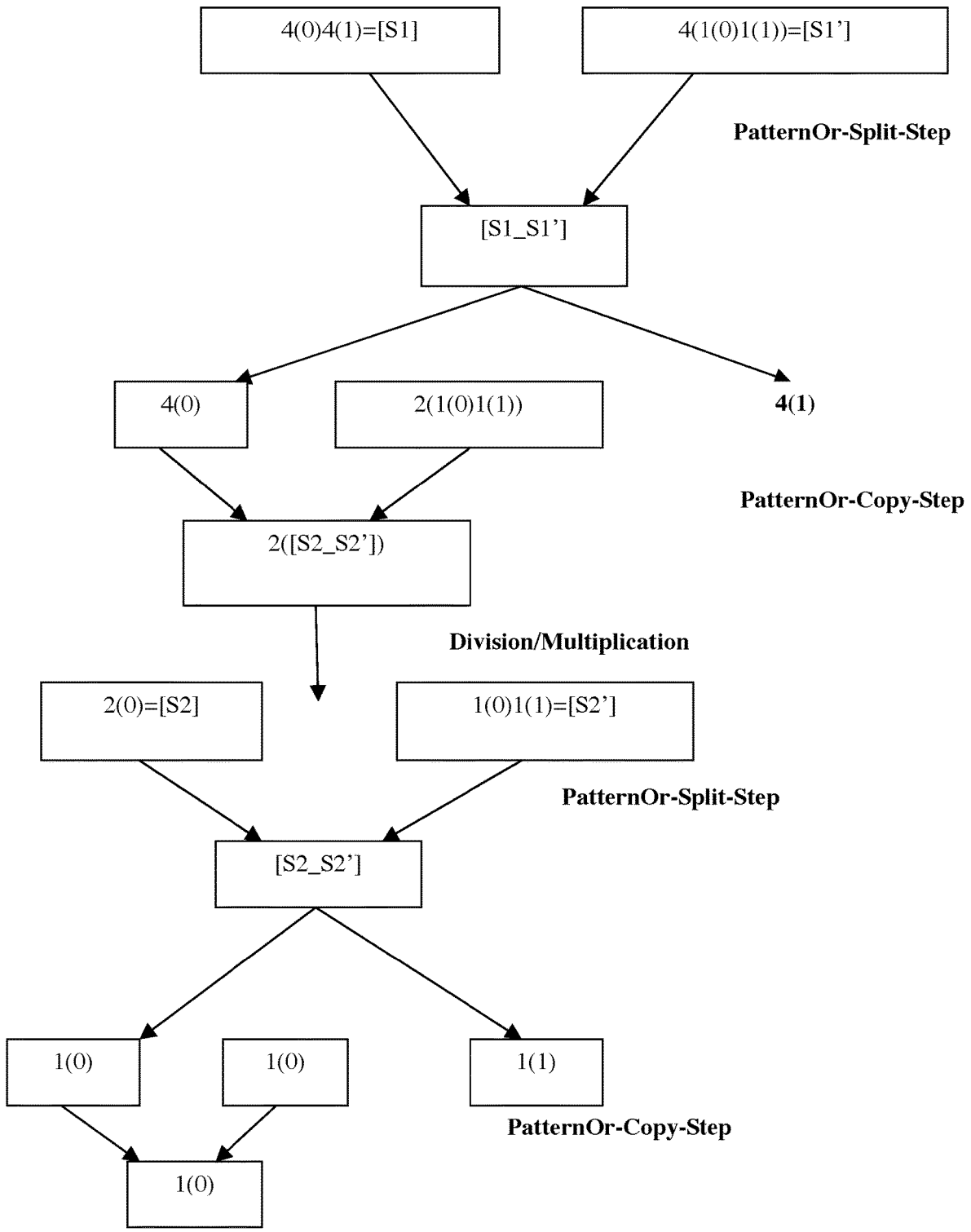
FIG. 6 shows a logic pattern tree in construction for C1.
Figure 7:
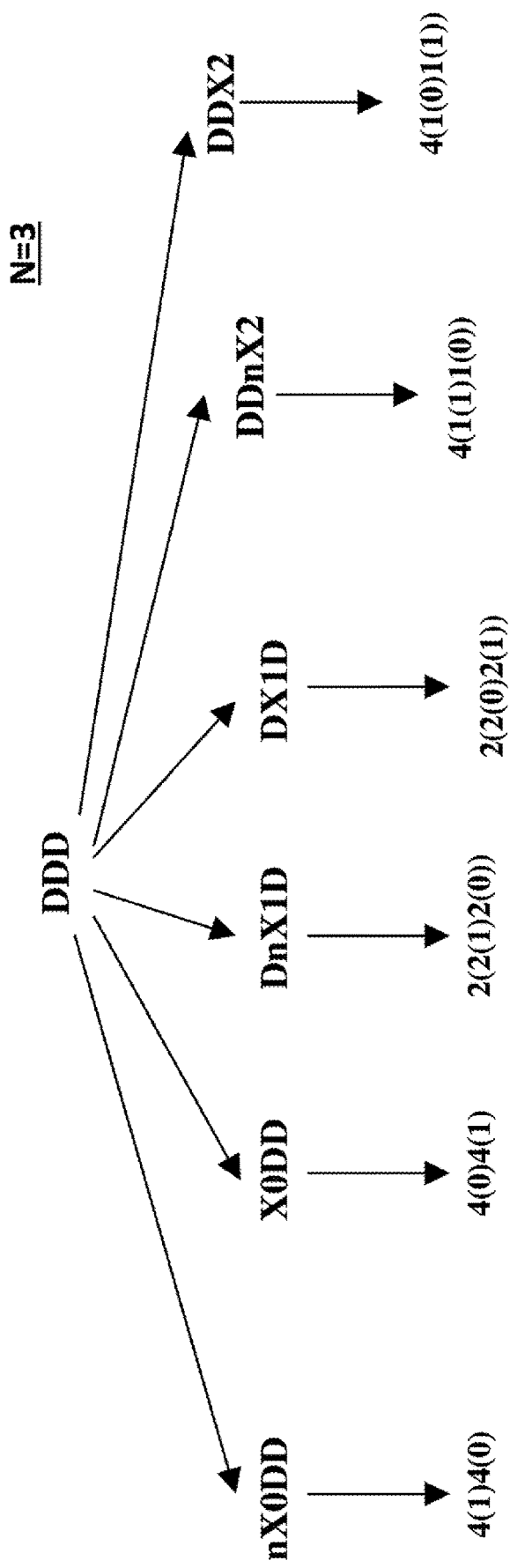
FIG. 7 illustrates a pattern tree for n=3.
Figure 8:
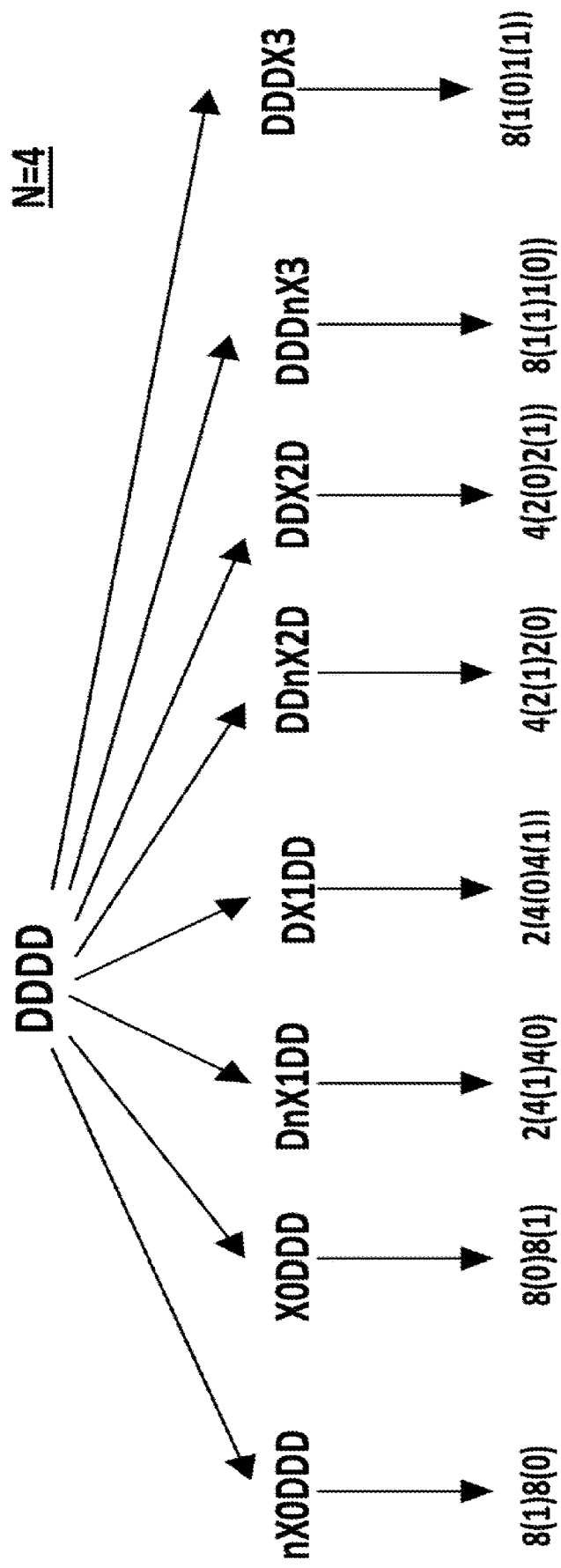
FIG. 8 illustrates a pattern tree for n=4.
Figure 9A:
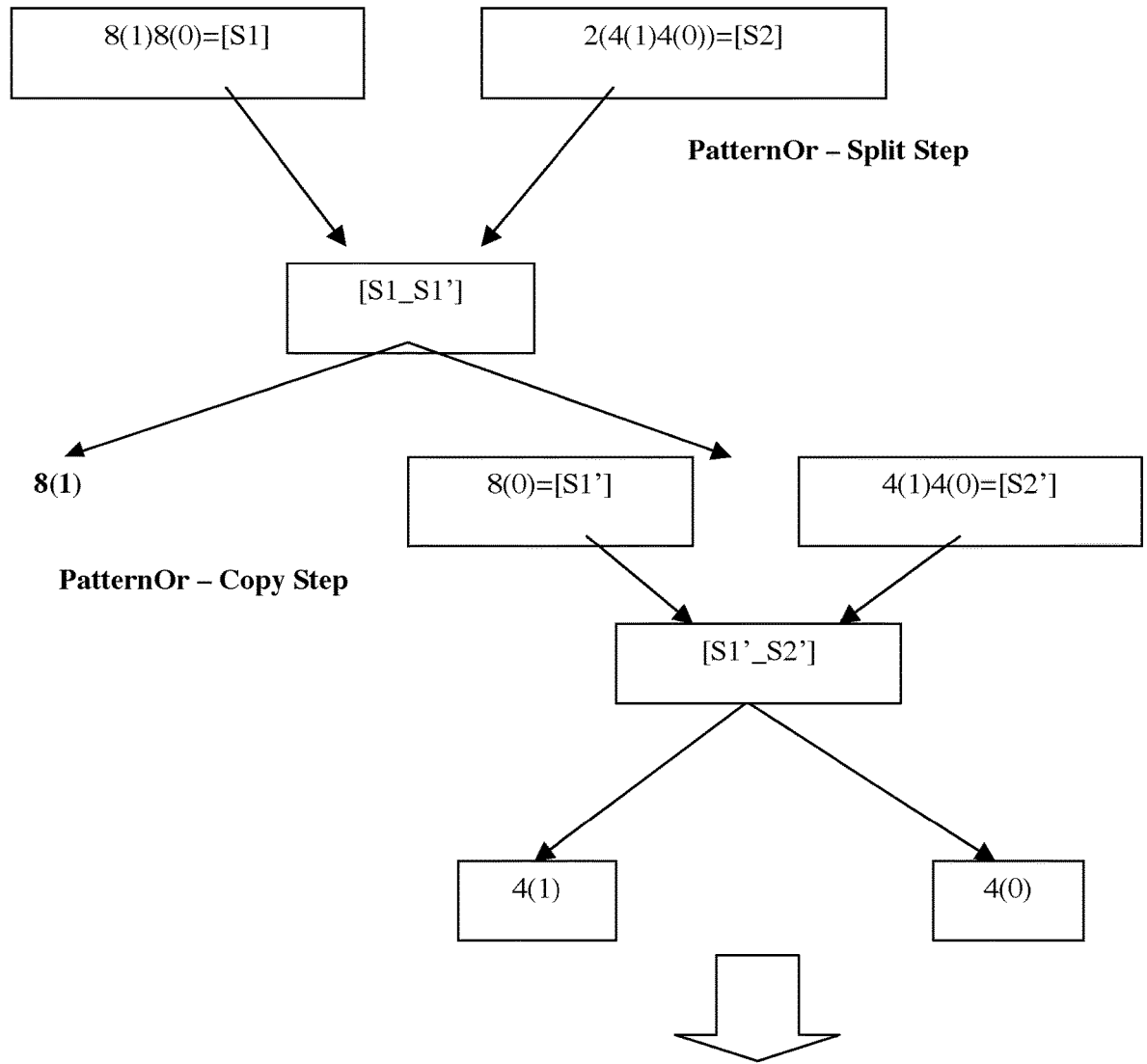
FIGS. 9A-9D illustrate the generation of the full logic pattern tree for C1.
Figure 9B:
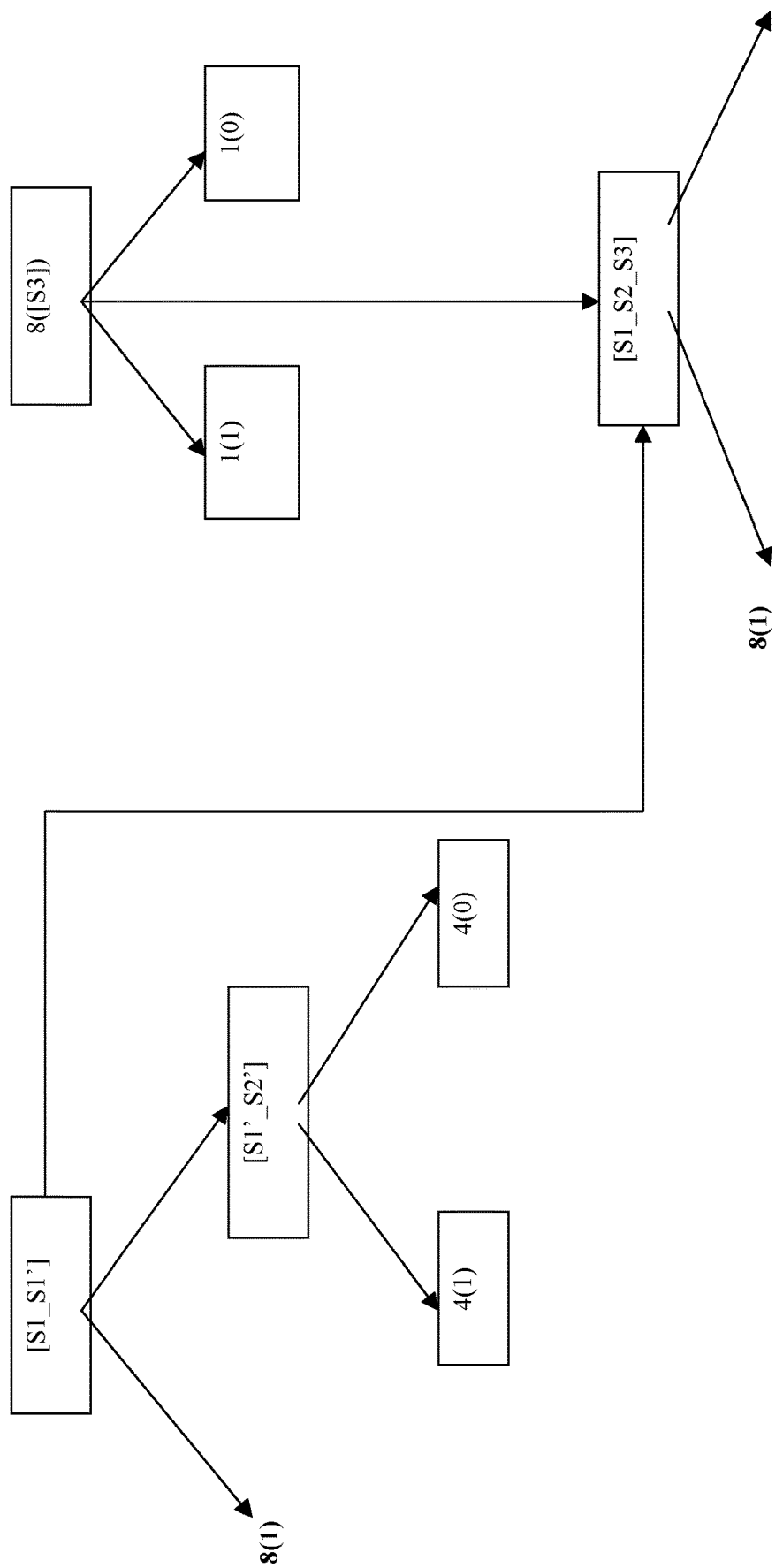
Figure 9C:
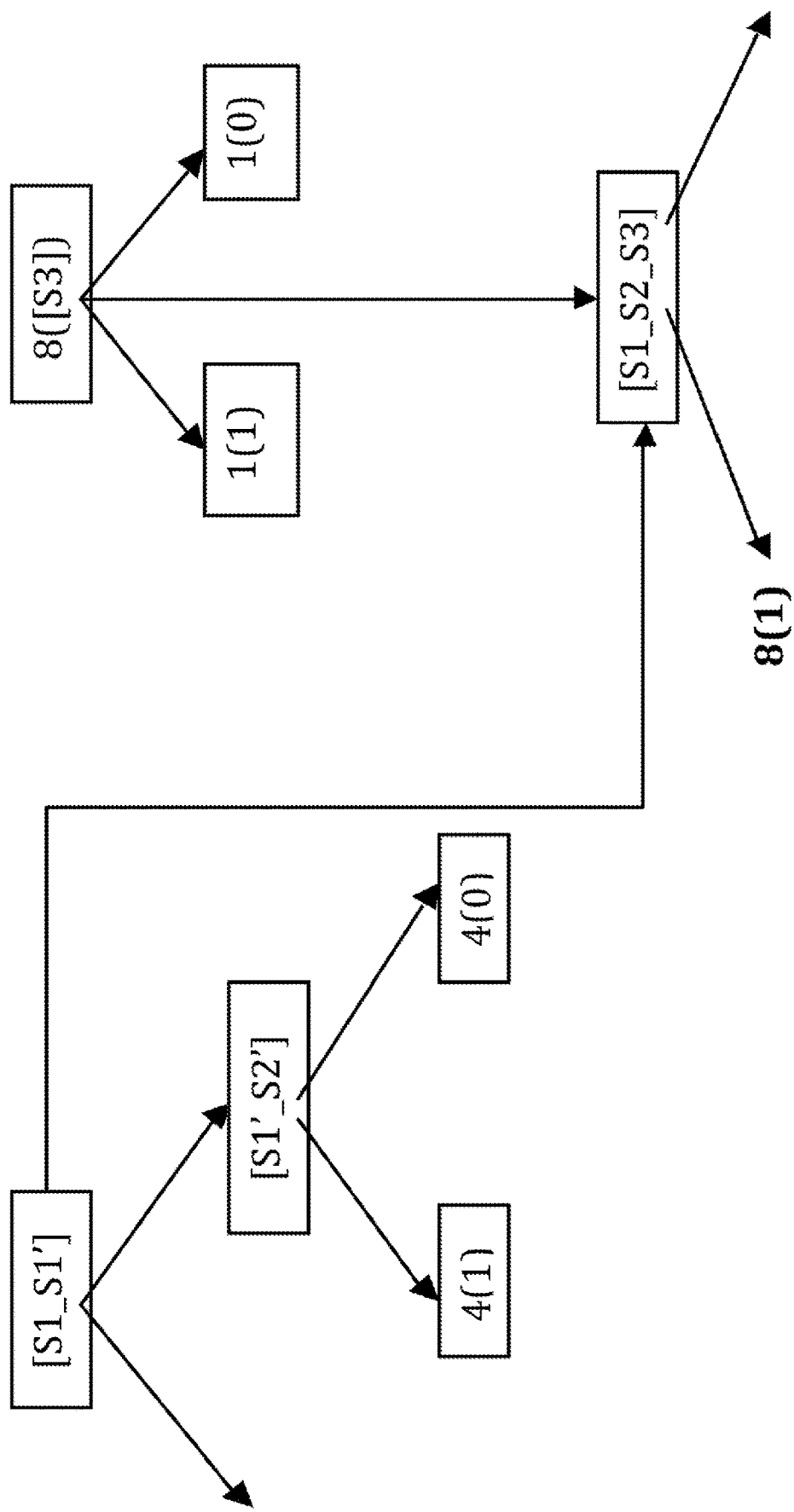
Figure 9D:
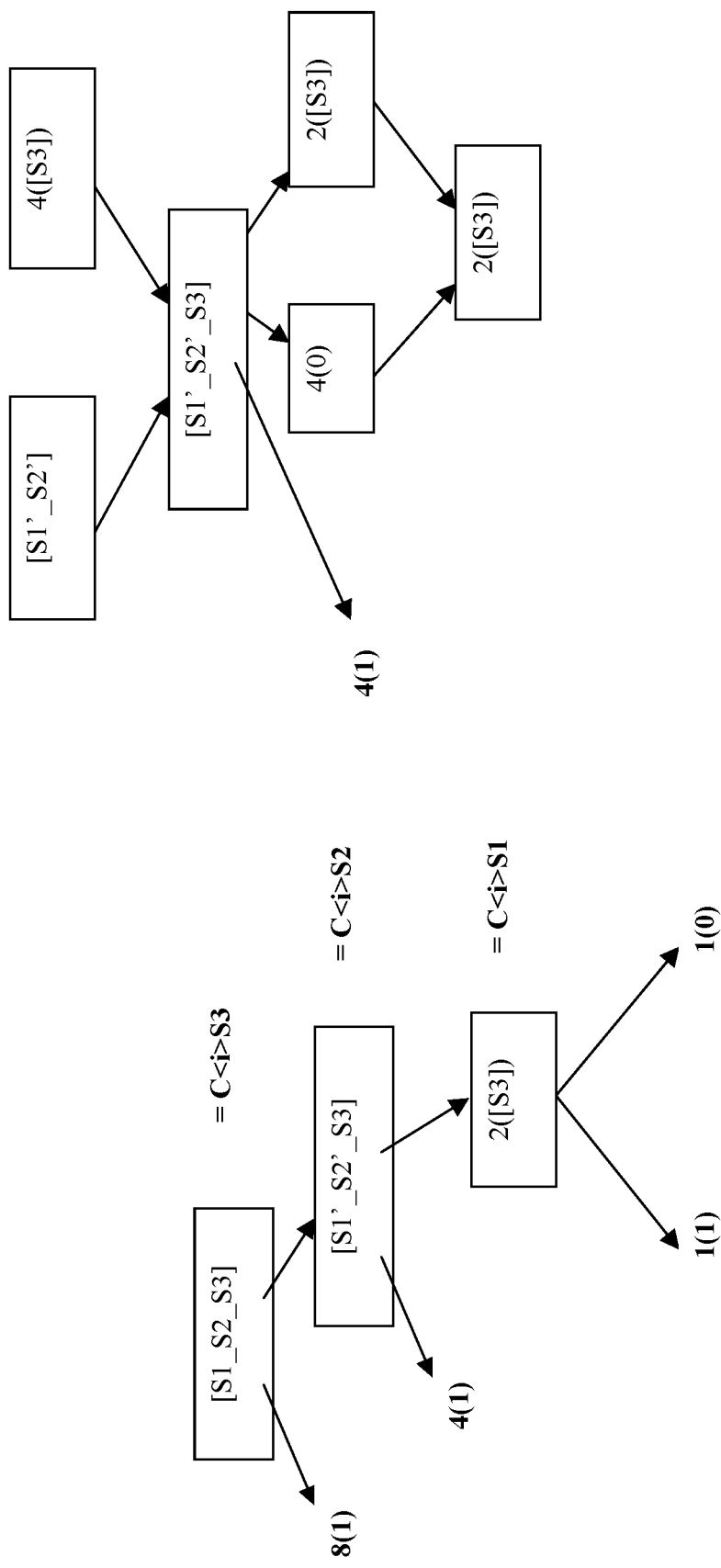
Figure 10A:
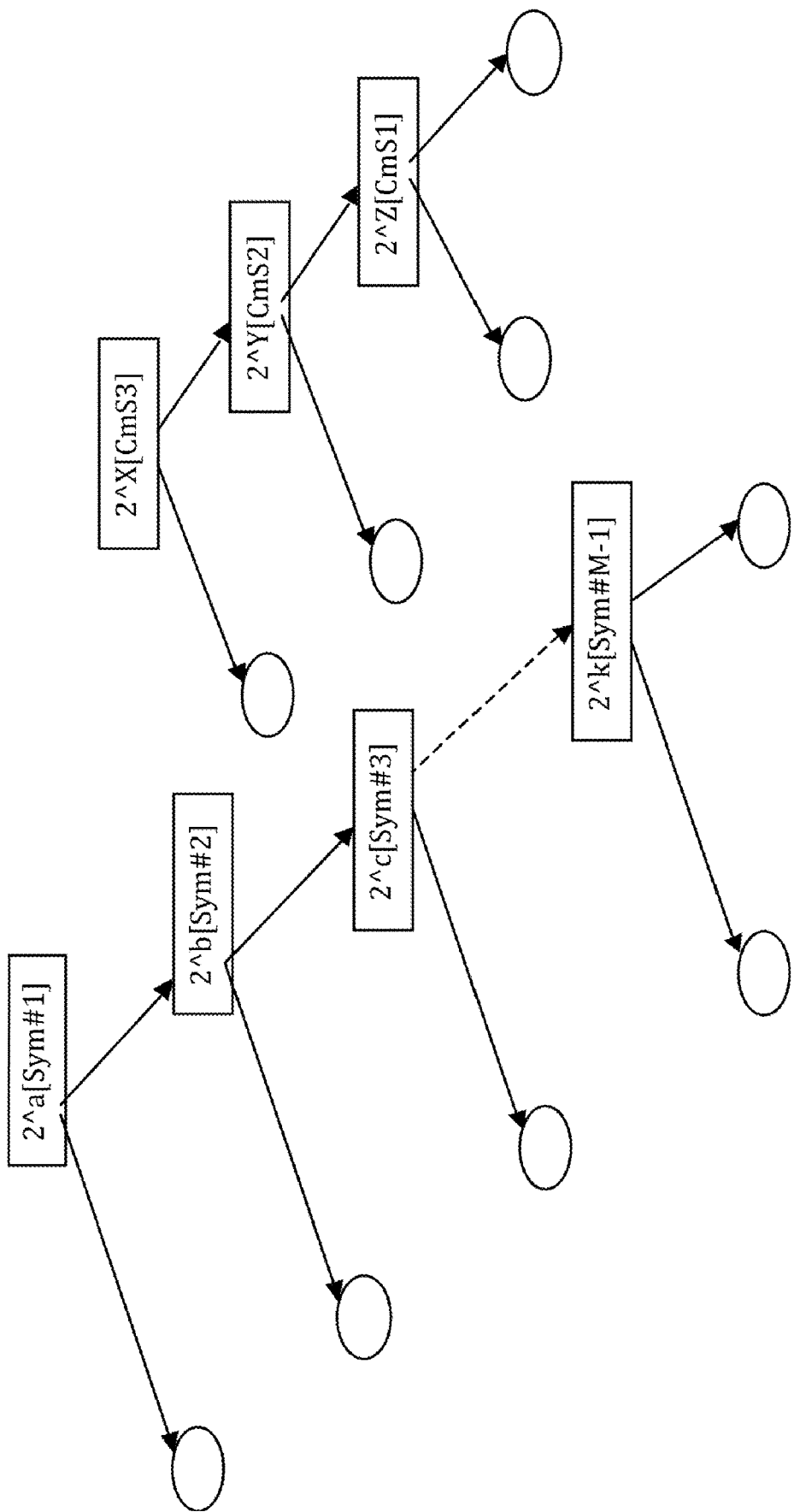
FIGS. 10A-10B show the most important case differences of creating a logic pattern tree for all the clauses of a logic formula.
Figure 10B:
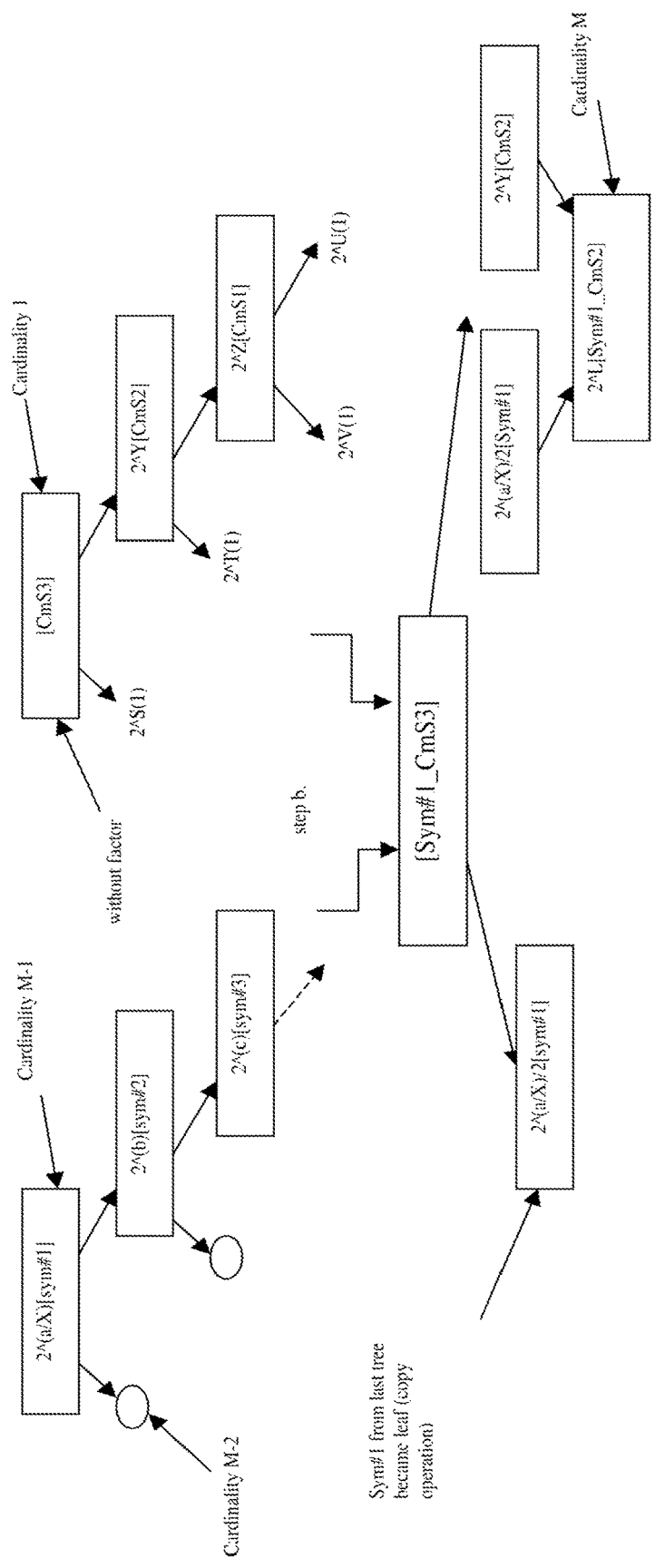
Figure 10D:
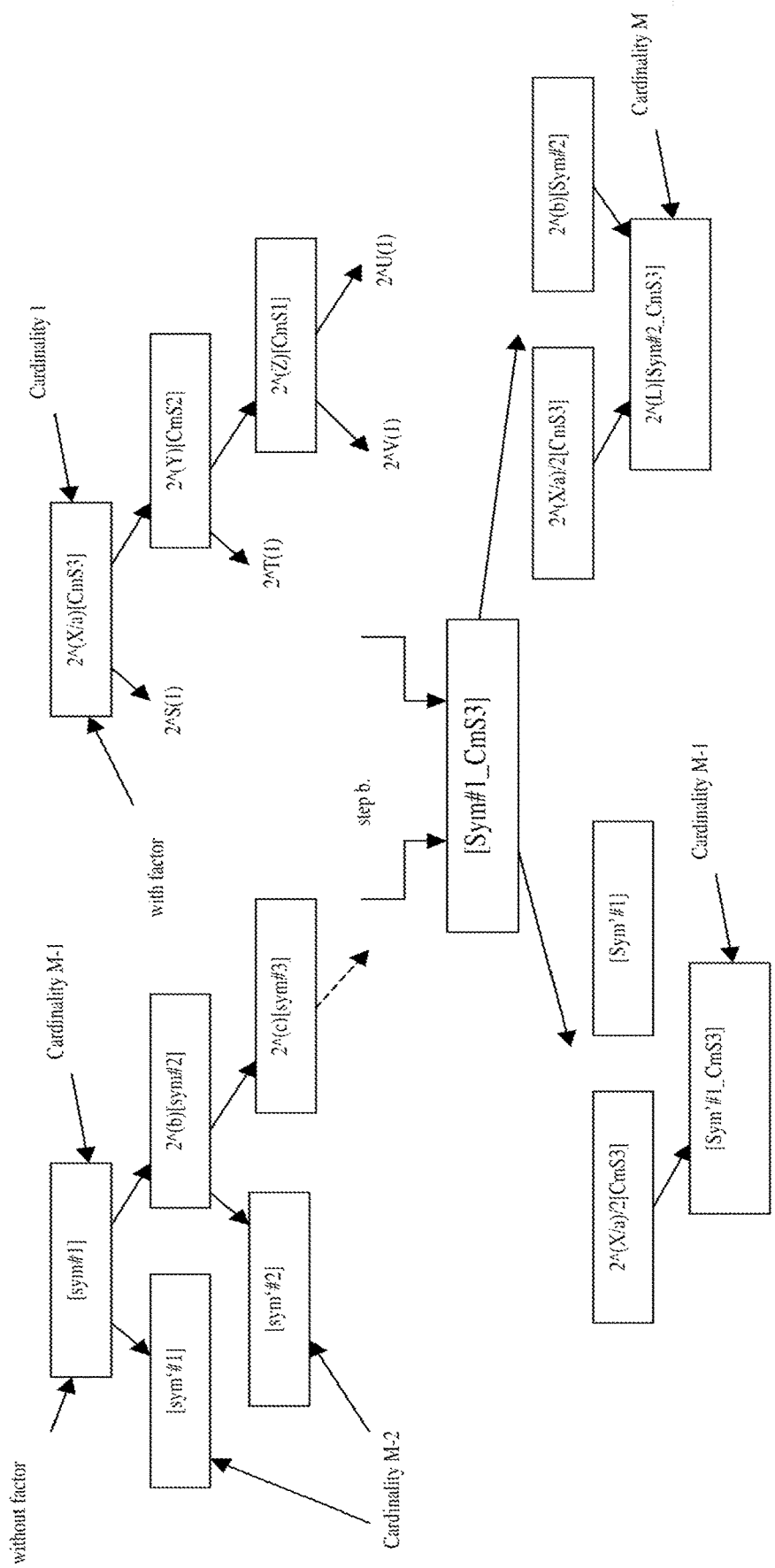
Figure 11A:
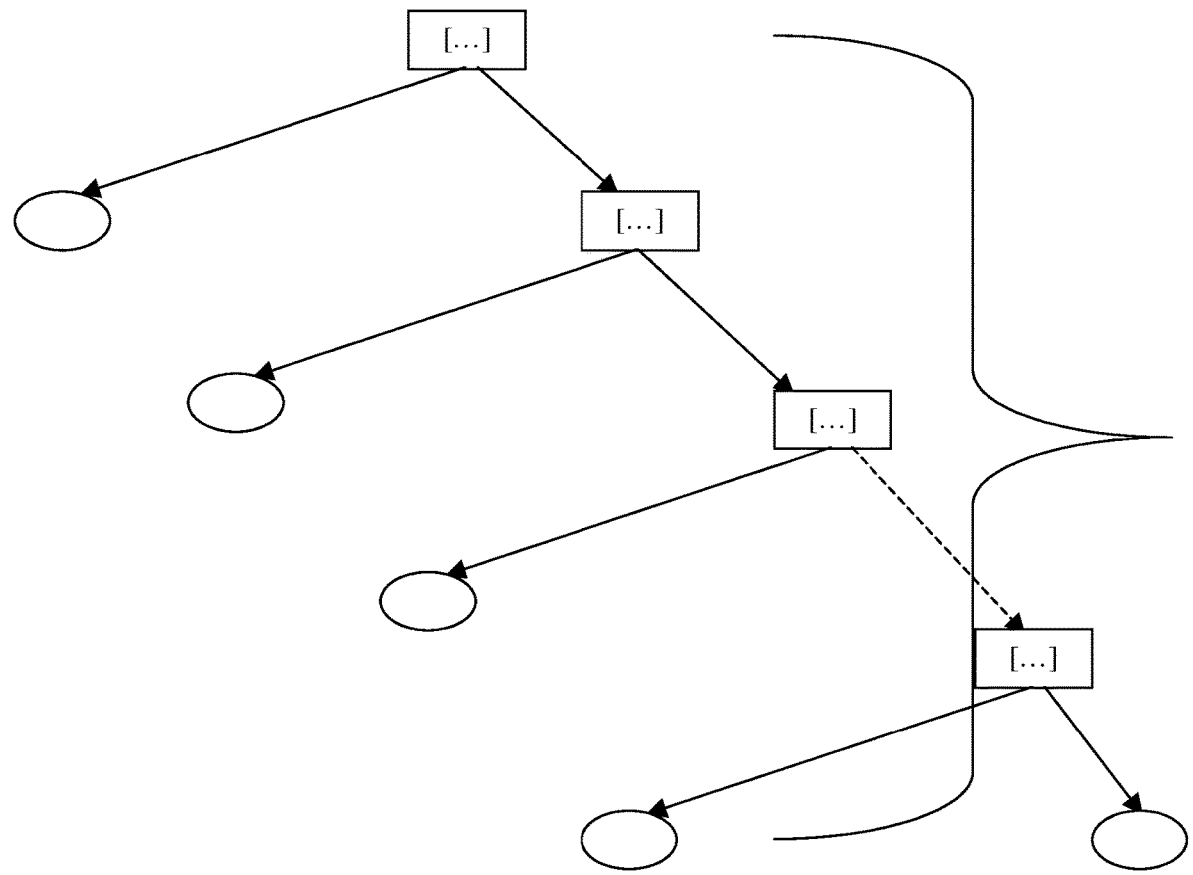
FIG. 11A shows the most common case of a logic input tree for Method 4.
Figure 11B:
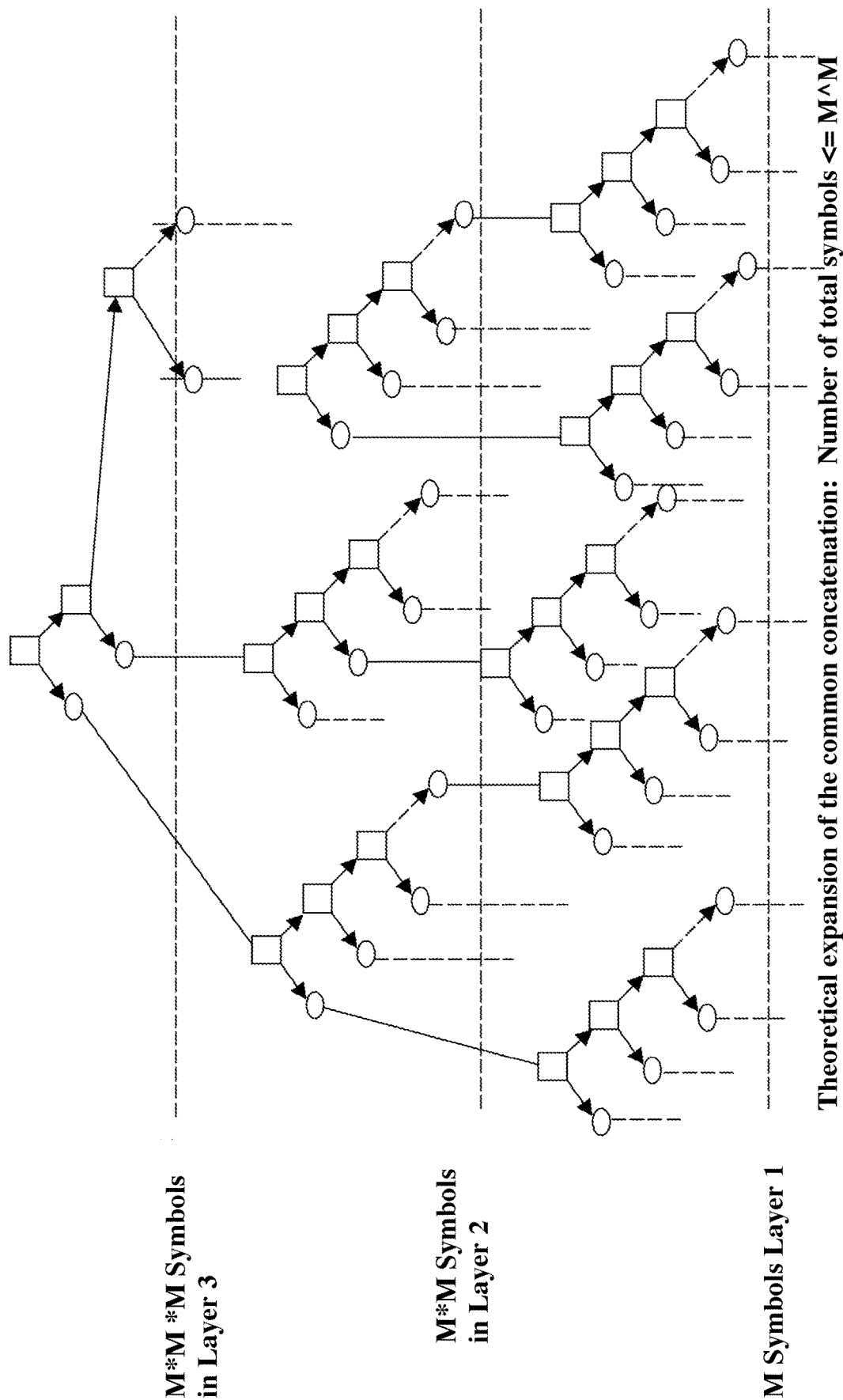
FIG. 11B illustrates the theoretical expansion of the tree in FIG. 11A.
Figure 12A:
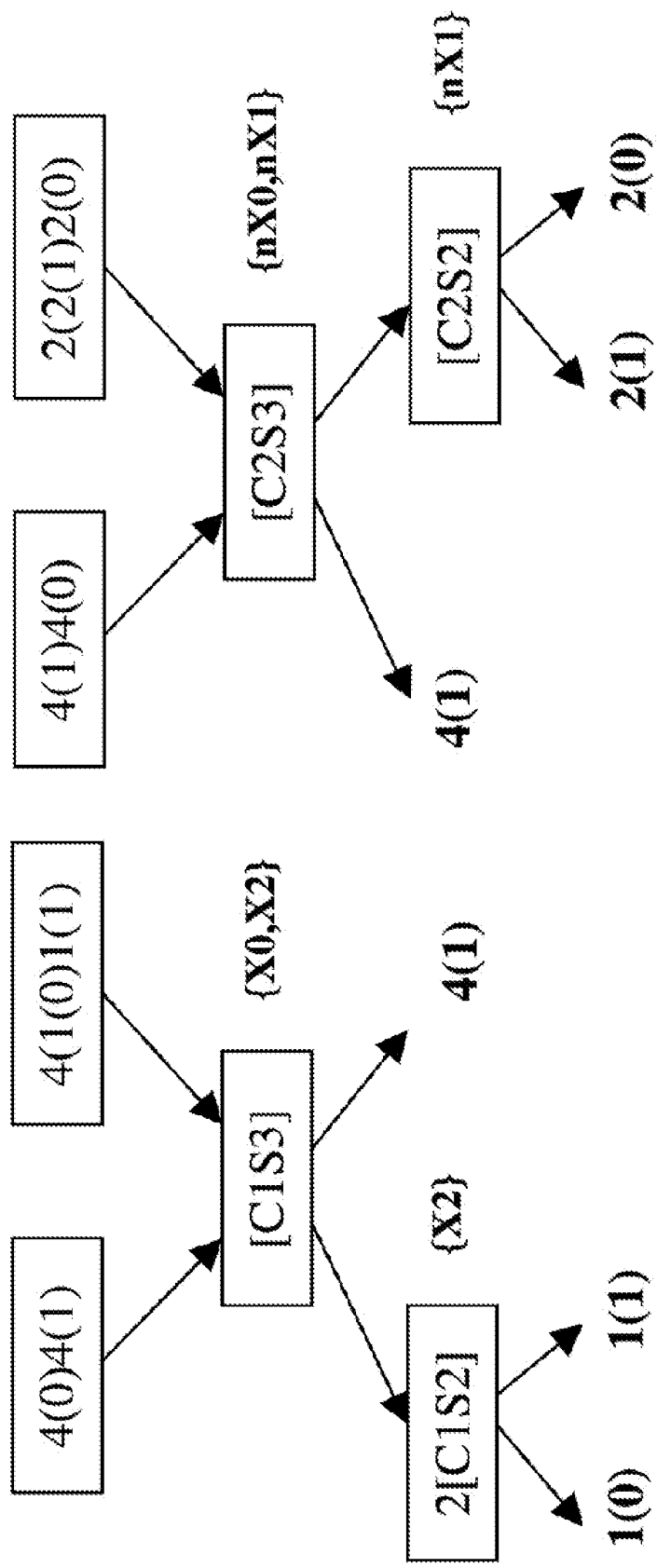
FIGS. 12A-12B illustrate the creation of decision trees for a clause set with canonical divisions.
Figure 12B:
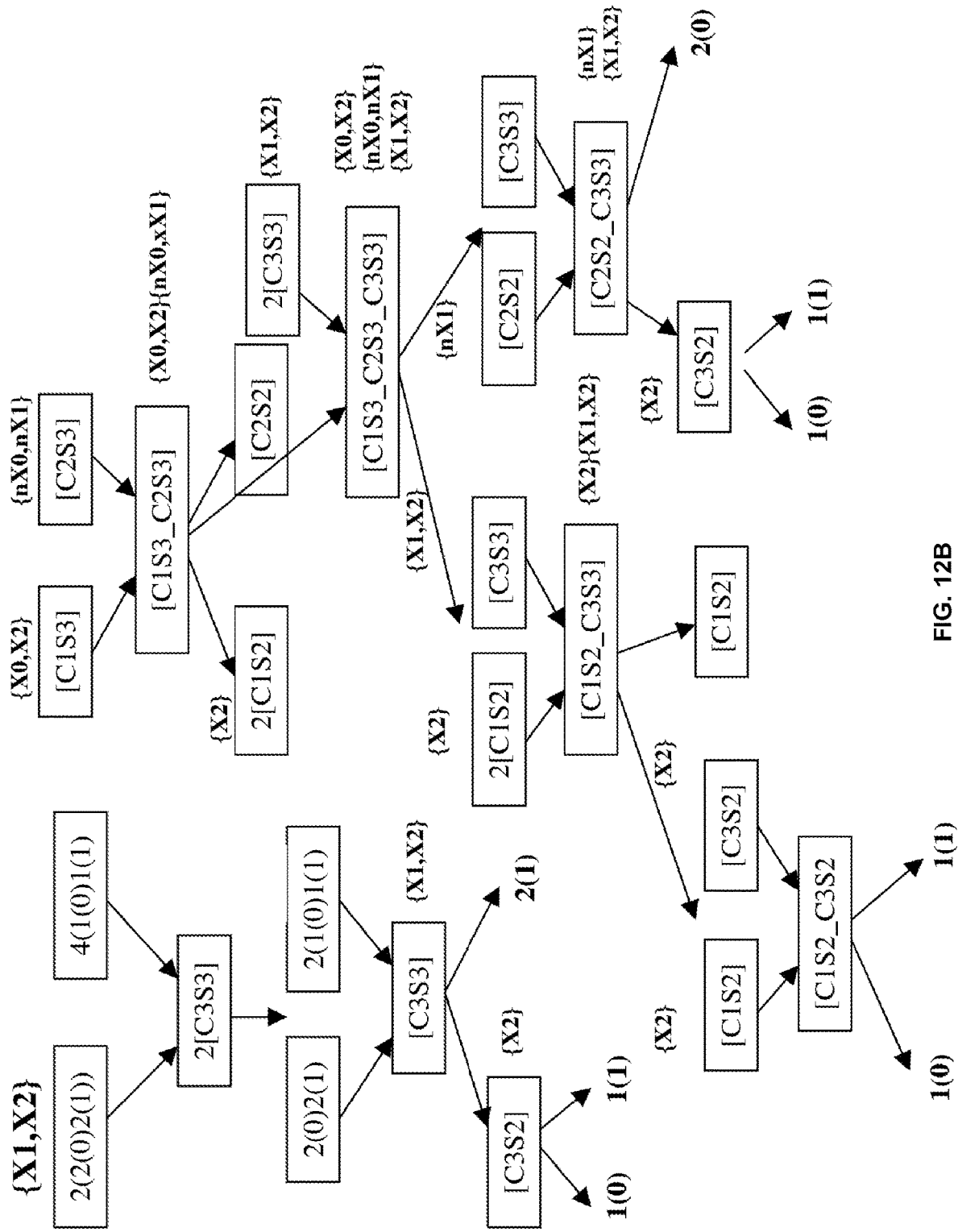
Figure 12C:
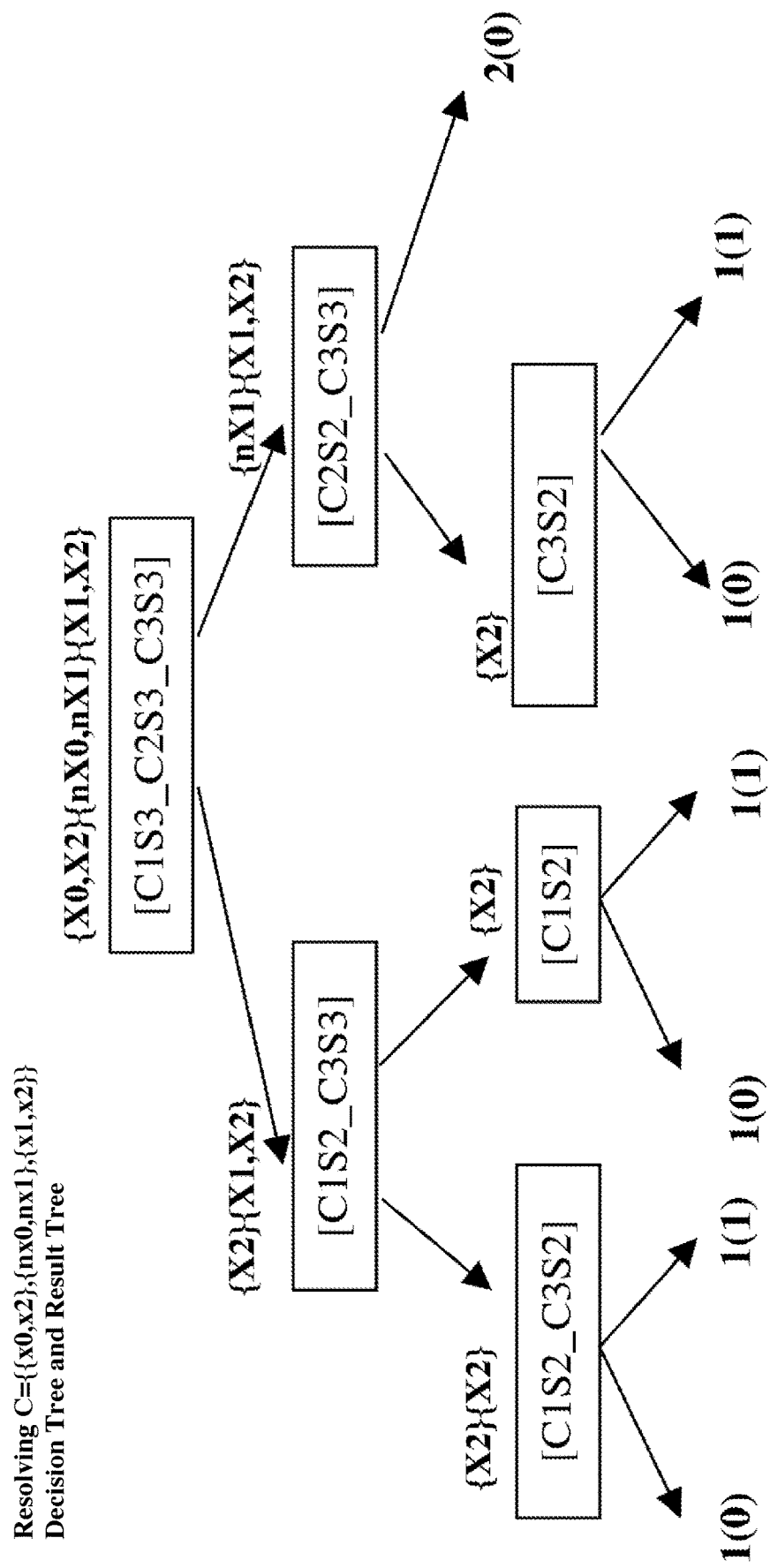
FIGS. 12C-12D show the transition from the result- to the decision tree.
Figure 12D:
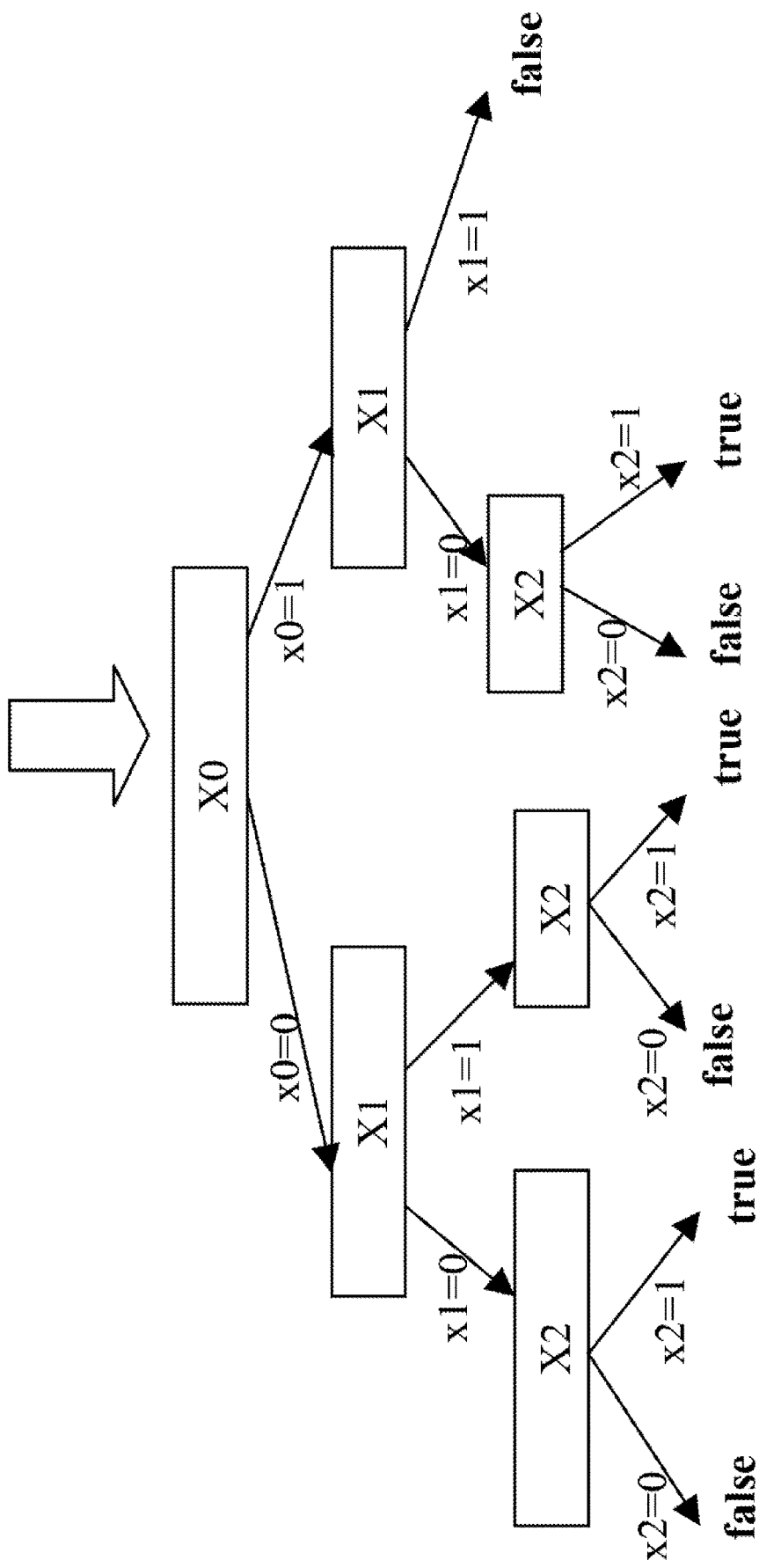

The invention claimed is:
1. A method of applying a database query to a relational database, the database having one or more records, the database query reciting a relationship between a database record and a plurality of literals, the method including steps of:
converting the database query to a plurality of clauses, each of the plurality of clauses reciting one or more literals of the plurality of literals;
converting the plurality of literals into a set of pattern strings, wherein
the set of pattern strings includes at least one selected pattern string for each literal;
for N literals, the at least one selected pattern string for the $k^{th}$ literal $X_k$, $0 \leq k \leq N-1$, includes:
a first pattern string including a factor ($2^k$) copies of a first pattern, wherein the first pattern includes a factor ($2^{N-K-1}$) copies of a "1" bit followed by a factor ($2^{N-K-1}$) copies of a "0" bit; or
a second pattern string including a factor ($2^k$) copies of a second pattern, wherein the second pattern includes a factor ($2^{N-K-1}$) copies of a "0" bit followed by a factor ($2^{N-K-1}$) copies of a "1" bit;
joining pattern strings for all literals of a particular clause by a special type of OR operation (patternOR), to represent the particular clause;
repeating the step of joining pattern strings for each of the plurality of clauses to obtain a plurality of binary trees corresponding to the plurality of clauses;
generating a result tree by joining the plurality of binary trees by a special type of AND operation (patternAND);
using the result tree to find a truth value of the plurality of clauses of the database query;
selecting database records satisfying the truth value as a response to the database query.

2. A method as in claim 1, wherein
the patternOR operation of pattern strings Z1 and Z2, when Z1 includes a factor f of a first pattern and Z2 includes a factor g of a second pattern, includes:
when f≤g and f >1, set the patternOR operation to a result including factor (f) copies of a patternOR operation of Z1/f and Z2/f;
when f=1 and g>1, set the patternOR operation to a result including a concatenation of a patternOR operation of left-half(Z1) and Z2/2 and a patternOR operation of right-half(Z1) and Z2/2;
when f=g=1, set the patternOR operation to a result including a concatenation of a patternOR operation of left-half(Z1) and left-half(Z2) and a patternOR operation of right-half(Z1) and right-half(Z2);
when Z1 includes all "0" bits, set the patternOR operation to a result including Z2;
when Z1 includes all "1" bits, set the patternOR operation to a result including all "1" bits.

3. A method as in claim 1, wherein
the patternAND operation of pattern strings Z1 and Z2, when Z1 includes a factor f of a first pattern and Z2 includes a factor g of a second pattern, includes:
when f≤g and f >1, set the patternAND operation to a result including factor (f) copies of a patternAND operation of Z1/f and Z2/f;
when f=1 and g >1, set the patternAND operation to a result including a concatenation of a patternAND operation of left-half(Z1) and Z2/2 and a patternAND operation of right-half(Z1) and Z2/2;
when f=g=1, set the patternAND operation to a result including a concatenation of a patternAND operation of left-half(Z1) and left-half(Z2) and a patternAND operation of right-half(Z1) and right-half(Z2);
when Z1 includes all "0" bits, set the patternAND operation to a result including Z1;
when Z1 includes all "1" bits, set the patternAND operation to a result including Z2.

4. A method as in claim 1, wherein
the method is performed in polynomial time with respect to the number of literals.

5. A relational database system including:
a processor coupled to a non-transitory memory, the non-transitory memory including a relational database and the processor including instructions disposed to perform one or more functions on database queries;
the relational database having one or more records and disposed to receive one or more database queries to be applied to the relational database, each particular database query reciting a relationship between a database record and a plurality of literals;
the functions including a query convertor disposed to convert the database query to a plurality of clauses, each of the plurality of clauses reciting one or more literals of the plurality of literals;
the functions including a pattern string generator disposed to determine a set of pattern strings, wherein
the set of pattern strings includes at least one selected pattern string for each literal,
for N literals, the at least one selected pattern string for the $k^{th}$ literal $X_k$, $0 \leq k \leq N-1$, includes:
a first pattern string including a factor ($2^k$) copies of a first pattern, wherein the first pattern includes a factor ($2^{N-K-1}$) copies of a "1" bit followed by a factor ($2^{N-K-1}$) copies of a "0" bit, or
a second pattern string including a factor ($2^k$) copies of a second pattern, wherein the second pattern includes a factor ($2^{N-K-1}$) copies of a "0" bit followed by a factor ($2^{N-K-1}$) copies of a "1" bit;
the functions including a special type of OR operation (patternOR) disposed to join pattern strings for literals of a particular clause to represent the particular clause and repeating the joining pattern strings step for each of the plurality of clauses to obtain a plurality of binary trees corresponding to the plurality of clauses;
the functions including a special type of AND operation (patternAND) disposed to join the plurality of binary trees to generate a result tree;
the functions including instructions disposed to find a truth value of the result tree and select database records satisfying the truth value as a response to the database query.

6. A system as in claim 5, wherein
the patternOR operation of pattern strings Z1 and Z2, when Z1 includes a factor f of a first pattern and Z2 includes a factor g of a second pattern, includes
when f≤g and f >1, set the patternOR operation to a result including factor (f) copies of a patternOR operation of Z1/f and Z2/f;
when f=1 and g >1, set the patternOR operation to a result including a concatenation of a patternOR operation of left-half(Z1) and Z2/2 and a patternOR operation of right-half(Z1) and Z2/2;
when f=g=1, set the patternOR operation to a result including a concatenation of a patternOR operation of left-half(Z1) and left-half(Z2) and a patternOR operation of right-half(Z1) and right-half(Z2);
when Z1 includes all "0" bits, set the patternOR operation to a result including Z2;
when Z1 includes all "1" bits, set the patternOR operation to a result including all "1" bits.

7. A system as in claim 5, wherein
the patternAND operation of pattern strings Z1 and Z2, when Z1 includes a factor f of a first pattern and Z2 includes a factor g of a second pattern, includes
when f≤g and f>1, set the patternAND operation to a result including factor (f) copies of a patternAND operation of Z1/f and Z2/f;
when f=1 and g >1, set the patternAND operation to a result including a concatenation of a patternAND combination of left-half(Z1) and Z2/2 and a patternAND operation of right-half(Z1) and Z2/2;
when f=g=1, set the patternAND operation to a result including a concatenation of a patternAND operation of left-half(Z1) and left-half(Z2) and a patternAND operation of right-half(Z1) and right-half(Z2);
when Z1 includes all "0" bits, set the patternAND operation to a result including Z1;
when Z1 includes all "1" bits, set the patternAND operation to a result including Z2.

8. A system as in claim 5, wherein
the system performs its operation in polynomial time with respect to the number of literals.

9. A method of applying a database query to a relational database, the database having one or more records, the database query reciting a relationship between a database record and a plurality of literals, the method including steps of:
converting the database query to a plurality of clauses, each of the plurality of clauses reciting one or more literals of the plurality of literals;
converting the plurality of literals into a set of pattern strings, wherein the set of pattern strings includes at least one selected pattern string for each literal;

for N literals, the at least one selected pattern string for the $k^{th}$ literal $X_k$, $0 \leq k \leq N-1$, includes:

a first pattern string including a factor ($2^k$) copies of a first pattern, wherein the first pattern includes a factor ($2^{N-K-1}$) copies of a "1" bit followed by a factor ($2^{N-K-1}$) copies of a "0" bit; or a second pattern string including a factor ($2^k$) copies of a second pattern, wherein the second pattern includes a factor ($2^{N-K-1}$) copies of a "0" bit followed by a factor ($2^{N-K-1}$) copies of a "1" bit;

joining pattern strings for all literals of a particular clause by a special type of OR operation (patternOR), to represent the particular clause;

repeating the step of joining pattern strings for each of the plurality of clauses to obtain a plurality of binary trees corresponding to the plurality of clauses;

generating a result tree by joining the plurality of binary trees by a special type of AND operation (patternAND);

using the result tree to find a truth value of the plurality of clauses of the database query, wherein using the result tree to find a truth value includes converting the result tree into a decision tree;

selecting database records satisfying the truth value as a response to the database query.

10. A method as in claim 9, wherein when a selected node in the decision tree represents a patternOR operation on a first literal and a second literal, performing the patternOR operation on a first pattern string and a second pattern string representing the first literal and the second literal respectively;

when the selected node in the decision tree represents a patternAND operation on the first literal and the second literal, performing the patternAND operation on the first pattern string and the second pattern string.

11. A method as in claim 9, wherein the patternOR operation of pattern strings Z1 and Z2, when Z1 includes a factor f of a first pattern and Z2 includes a factor g of a second pattern, includes when f≤g and f >1, set the patternOR operation to a result including factor (f) copies of a patternOR operation of Z1/f and Z2/f;

when f=1 and g>1, set the patternOR operation to a result including a concatenation of a patternOR operation of left-half(Z1) and Z2/2 and a patternOR operation of right-half(Z1) and Z2/2;

when f=g=1, set the patternOR operation to a result including a concatenation of a patternOR operation of left-half(Z1) and left-half(Z2) and a patternOR operation of right-half(Z1) and right-half(Z2);

when Z1 includes all "0" bits, set the patternOR operation to a result including Z2;

when Z1 includes all "1" bits, set the patternOR operation to a result including all "1" bits.

12. A method as in claim 9, wherein the patternAND operation of pattern strings Z1 and Z2, when Z1 includes a factor f of a first pattern and Z2 includes a factor g of a second pattern, includes:

when f≤g and f >1, set the patternAND operation to a result including factor (f) copies of the patternAND operation of Z1/f and Z2/f;

when f=1 and g >1, set the patternAND operation to a result including a concatenation of a patternAND operation of left-half(Z1) and Z2/2 and a patternAND operation of right-half(Z1) and Z2/2;

when f=g=1, set the patternAND operation to a result including a concatenation of a patternAND operation of left-half(Z1) and left-half(Z2) and a patternAND operation of right-half(Z1) and right-half(Z2);

when Z1 includes all "0" bits, set the patternAND operation to a result including Z1;

when Z1 includes all "1" bits, set the patternAND operation to a result including Z2.

13. A method as in claim 9, wherein the method is performed in polynomial time with respect to the number of literals.

* * * * *